United States Patent
Wright et al.

(10) Patent No.: US 9,652,978 B2
(45) Date of Patent: May 16, 2017

(54) TRAINABLE TRANSCEIVER AND MOBILE COMMUNICATIONS DEVICE TRAINING SYSTEMS AND METHODS

(71) Applicant: GENTEX CORPORATION, Zeeland, MI (US)

(72) Inventors: Thomas S. Wright, Holland, MI (US); Steven L. Geerlings, Holland, MI (US); Todd R. Witkowski, Zeeland, MI (US); Douglas C. Papay, Zeeland, MI (US); Carl L. Shearer, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/688,951

(22) Filed: Apr. 16, 2015

(65) Prior Publication Data

US 2015/0302732 A1 Oct. 22, 2015

Related U.S. Application Data

(60) Provisional application No. 61/981,510, filed on Apr. 18, 2014.

(51) Int. Cl.
*G05B 19/00* (2006.01)
*G08C 17/02* (2006.01)

(52) U.S. Cl.
CPC ......... *G08C 17/02* (2013.01); *G08C 2201/92* (2013.01); *G08C 2201/93* (2013.01)

(58) Field of Classification Search
CPC ........... H04N 5/4403; H04N 21/42204; G08C 2201/20; G08C 17/02

(Continued)

(56) References Cited

U.S. PATENT DOCUMENTS

2010/0144284 A1* 6/2010 Chutorash .............. G08C 17/02
455/66.1
2011/0055780 A1 3/2011 Venell
(Continued)

FOREIGN PATENT DOCUMENTS

WO WO 2008/027830 A2 3/2008
WO WO-2011/100142 A2 8/2011

OTHER PUBLICATIONS

International Preliminary Report on Patentability and Transmittal received in corresponding International Application No. PCT/US2015/026249, mailed Nov. 24, 2016, 6 pages.
(Continued)

*Primary Examiner* — Don N Vo
(74) *Attorney, Agent, or Firm* — Foley & Lardner LLP; Bradley D. Johnson

(57) ABSTRACT

A system for controlling a remote device includes a mobile communications device and a trainable transceiver. The mobile communications device includes a display, a camera flash, a speaker, and a processing circuit coupled to the display, the camera flash, and the speaker. The trainable transceiver includes a transceiver circuit, a communications device, and a control circuit coupled to the transceiver circuit and the communications device. The trainable transceiver is configured to be in communication with the mobile communications device using the communications device, and the control circuit is configured to receive training information from the mobile communications device and train the trainable transceiver to communicate with the remote device based on the training information.

19 Claims, 15 Drawing Sheets

(58) Field of Classification Search
USPC .......................................................... 340/5.25
See application file for complete search history.

(56) References Cited

U.S. PATENT DOCUMENTS

| | | | | |
|---|---|---|---|---|
| 2012/0115446 | A1* | 5/2012 | Gautama | G08C 17/02 455/414.1 |
| 2012/0146918 | A1* | 6/2012 | Kreiner | H04M 1/7253 345/173 |
| 2013/0261888 | A1* | 10/2013 | Nagai | G06F 17/00 701/36 |
| 2013/0267168 | A1* | 10/2013 | Jeon | H04B 5/0025 455/41.1 |
| 2014/0088827 | A1* | 3/2014 | Yashiro | B60L 1/00 701/36 |

OTHER PUBLICATIONS

International Search Report and Written Opinion mailed Nov. 10, 2016, in corresponding International Application No. PCT/US2015/026249, 7 pages.

\* cited by examiner

TRAINABLE TRANSCEIVER AND MOBILE COMMUNICATIONS DEVICE TRAINING SYSTEMS AND METHODS

CROSS-REFERENCE TO RELATED APPLICATIONS

This application claims the benefit of U.S. Provisional Application No. 61/981,510, filed Apr. 18, 2014, which is hereby incorporated by reference in its entirety.

BACKGROUND

The present invention relates generally to the field of trainable transceivers for inclusion within a vehicle. A trainable transceiver generally sends and/or receives wireless signals using a transmitter, receiver, and/or transceiver. The wireless signals may be used to control other devices. For example, a trainable transceiver may send a wireless control signal to operate a garage door opener. A trainable transceiver may be trained to operate with a particular device. Training may include providing the trainable transceiver with control information for use in generating a control signal. A trainable transceiver may be incorporated in a vehicle (integrally or contained within the vehicle) and used to control devices outside the vehicle. It is challenging an difficult to develop trainable transceivers which are easy to train to operate a variety of devices. It is further challenging and difficult to develop a trainable transceiver which interfaces with devices other than those being controlled (e.g., vehicle systems and/or systems located remote to the vehicle) for use in training and performing additional useful functions. For example, a trainable transceiver may communicate with a mobile communications device such as a smartphone. Additional devices such as a smartphone may be used in the training process.

SUMMARY OF THE INVENTION

One embodiment relates to a system for controlling a remote device includes a mobile communications device and a trainable transceiver. The mobile communications device includes a display, a camera flash, a speaker, and a processing circuit coupled to the display, the camera flash, and the speaker. The trainable transceiver includes a transceiver circuit, a communications device, and a control circuit coupled to the transceiver circuit and the communications device. The trainable transceiver is configured to be in communication with the mobile communications device using the communications device, and the control circuit is configured to receive training information from the mobile communications device and train the trainable transceiver to communicate with the remote device based on the training information.

Another embodiment relates to a trainable transceiver for instillation in a vehicle and for controlling a remote device including a transceiver circuit, and a control circuit coupled to the transceiver circuit. The control circuit is configured to be in communication with a mobile communications device, and wherein the control circuit is configured to communicate with the mobile communications device for receiving training information for use in training the trainable transceiver to communicate with the remote device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
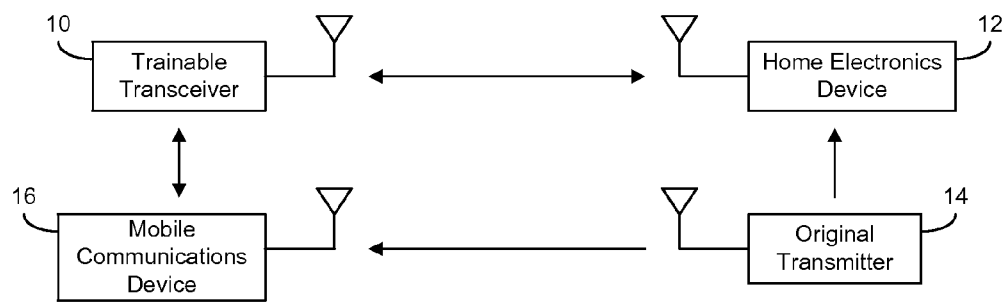
FIG. 1 illustrates communication between a trainable transceiver, mobile communications device, home electronics device, and original transmitter according to an exemplary embodiment.

Generally, a trainable transceiver controls one or more home electronic devices and/or remote devices. For example, the trainable transceiver may be a Homelink™ trainable transceiver. Home electronic devices may include devices such as a garage door opener, gate opener, lights, security system, and/or other device which is configured to receive activation signals and/or control signals. A home electronic device need not be associated with a residence but can also include devices associated with businesses, government buildings or locations, or other fixed locations. Remote devices may include mobile computing devices such as mobile phones, smartphones, tablets, laptops, computing hardware in other vehicles, and/or other devices configured to receive activation signals and/or control signals.

Activation signals may be wired or, preferably, wireless signals transmitted to a home electronic device and/or remote device. Activation signals may include control signals, control data, encryption information (e.g., a rolling code, rolling code seed, look-a-head codes, secret key, fixed code, or other information related to an encryption technique), or other information transmitted to a home electronic device and/or remote device. Activation signals may have parameters such as frequency or frequencies of transmission (e.g., channels), encryption information (e.g., a rolling code, fixed code, or other information related to an encryption technique), identification information (e.g., a serial number, make, model or other information identifying a home electronic device, remote device, and/or other device), and/or other information related to formatting an activation signal to control a particular home electronic device and/or remote device.

In some embodiments, the trainable transceiver receives information from one or more home electronic devices and/or remote devices. The trainable transceiver may receive information using the same transceiver user to send activation signals and/or other information to home electronic devices and/or remote devices. The same wireless transmission scheme, protocol, and/or hardware may be used from transmitting and receiving. The trainable transceiver may have two way communication with home electronic devices and/or remote devices. In other embodiments, the trainable transceiver includes additional hardware for two way communication with devices and/or receiving information from devices. In some embodiments, the trainable transceiver has only one way communication with a home electronic device and/or remote device (e.g., sending activation signals to the device). The trainable transceiver may receive information about the home electronic device and/or remote device using additional hardware. The information about the home electronic device and/or remote device may be received from an intermediary device such as an additional remote device and/or mobile communications device.

A trainable transceiver may also receive information from and/or transmit information to other devices configured to communicate with the trainable transceiver. For example, a trainable transceiver may receive information for cameras (e.g., imaging information may be received) and/or other sensors. The cameras and/or other sensors may communicate with a trainable transceiver wirelessly (e.g., using one or more transceivers) or through a wired connection. In some embodiments, a trainable transceiver may communicate with mobile communications devices (e.g., cell phones, tablets, smartphones, or other communication devices). In some embodiments, mobile communications devices may include other mobile electronics devices such as laptops, personal computers, and/or other devices. In still further embodiments, the trainable transceiver is configured to communicate with networking equipment such as routers, servers, switches, and/or other hardware for enabling network communication. The network may be the internet and/or a cloud architecture.

In some embodiments, the trainable transceiver transmits and/or receives information (e.g., activation signals, control signals, control data, status information, or other information) using a radio frequency signal. For example, the transceiver may transmit and/or receive radio frequency signals in the ultra-high frequency range, typically between 260 and 960 megahertz (MHz) although other frequencies may be used. In other embodiments, a trainable transceiver may include additional hardware for transmitting and/or receiving signals (e.g., activation signals and/or signals for transmitting and/or receiving other information). For example, a trainable transceiver may include a light sensor and/or light emitting element, a microphone and/or speaker, a cellular transceiver, an infrared transceiver, or other communication device.

A trainable transceiver may be configured (e.g., trained) to send activation signals and/or other information to a particular device and/or receive control signals and/or information from a particular device. The trainable transceiver may be trained by a user to work with particular remote devices and/or home electronic devices (e.g., a garage door opener). For example, a user may manually input control information into the trainable transceiver to configure the trainable transceiver to control the device. A trainable transceiver may also learn control information from an original transmitter. A trainable transceiver may receive a signal containing control information from an original transmitter (e.g., a remote sold with a home electronic device) and determine control information from the received signal. Training information (e.g., activation signal frequency, device identification information, encryption information, modulation scheme used by the device, or other information related to controlling a device via an activation signal) may also be received by a trainable transceiver from a remote device, mobile communications device, or other source.

A trainable transceiver may be mounted or otherwise attached to a vehicle in a variety of locations. For example, a trainable transceiver may be integrated into a dashboard or center stack (e.g., infotainment center) of a vehicle. The trainable transceiver may be integrated into the vehicle by a vehicle manufacturer. A trainable transceiver may be located in other peripheral locations. For example, a trainable transceiver may be removably mounted to a visor. The trainable transceiver may include mounting hardware such as a clip. A trainable transceiver may be mounted to other surfaces of a vehicle (e.g., dashboard, windshield, door panel, or other vehicle component). For example, a trainable transceiver may be secured with adhesive. In some embodiments, a trainable transceiver is integrated in a rear view mirror of the vehicle. A vehicle manufacturer may include a trainable transceiver in the rear view mirror.

In other embodiments, a vehicle may be retrofit to include a trainable transceiver. This may include attaching a trainable transceiver to a vehicle surface using a clip, adhesive, or other mounting hardware as described above. Alternatively, it may include replacing a vehicle component with one that includes an integrated trainable transceiver and/or installing a vehicle component which includes an integrated trainable transceiver. For example, an aftermarket rear view mirror, vehicle camera system (e.g., one or more cameras and one or more display screens), and/or infotainment center may include an integrated trainable transceiver. In further embodiments, one or more components of a trainable transceiver may be distributed within the vehicle.

Referring now to FIG. 1, a trainable transceiver 10 may communicate with a home electronics device 12. In some embodiments, the trainable transceiver 10 and home electronics device 12 communicate using two way communication. For example, the trainable transceiver 10 may transmit activation signals, control signals, requests for information, data and/or other information to the home electronics device 12. The home electronics device 12 may transmit, status information, responses to requests for information, data, requests for information, and/or other information to the trainable transceiver 10. The same and/or similar two way communication may be made between the trainable transceiver 10 and a remote device. In other embodiments, there is only one way communication between the trainable transceiver 10 and the home electronics device 12 and/or remote device. For example, the trainable transceiver 10 transmits activation signals, control signals, data, and/or other information to the home electronics device 12 and/or remote device, and the trainable transceiver 10 does not receive transmissions from the home electronics device 12 or remote device.

In some embodiments, an original transmitter 14 may communicate with the home electronics device 12 and/or remote device. In one embodiment, the original transmitter 14 communicates with the home electronics device 12 and/or remote device using one way communication. For example, the original transmitter 14 may transmit an activation signal to the home electronics device 12 and/or remote device. In some embodiments, the original transmitter 14 may be the source of an activation signal, activation signal parameters, and/or other information related to controlling the home electronics device 12 and/or remote device. This information may be received by a mobile communications device 16 as discussed in greater detail herein. In alternative embodiments, the original transmitter 14 is capable of two way communication. In some embodiments, the trainable transceiver 10 may be configured to receive an activation signal and/or other information from the original transmitter 14.

In one embodiment, the trainable transceiver 10 is capable of two way communication with the mobile communications device 16. For example, a smartphone may be paired with the trainable transceiver 10 such that the trainable transceiver 10 and smartphone communicate using wireless transceivers (e.g., using radio frequency transceivers and/or a protocol such as Bluetooth communication). The trainable transceiver 10 and mobile communications device 16 may exchange information such as status, notifications, activation signals, training information, activation signal parameters, device identification information (e.g., the serial number, make, and/or model of the home electronics device 12), and/or other information.

In some embodiments, the communication described herein with respect to FIG. 1 is wireless communication. In other embodiments, communication may be wired communication. For example, communication between two or more devices may use a wireless network, wireless transceiver, and/or wireless communication protocol (e.g., WiFi, Zigbee, Bluetooth, cellular, etc.), a wired interface and/or protocol (e.g., Ethernet, universal serial bus (USB), Firewire, etc.), or other communications connection (e.g. infrared, optical, ultrasound, etc.).

Figure 2A:
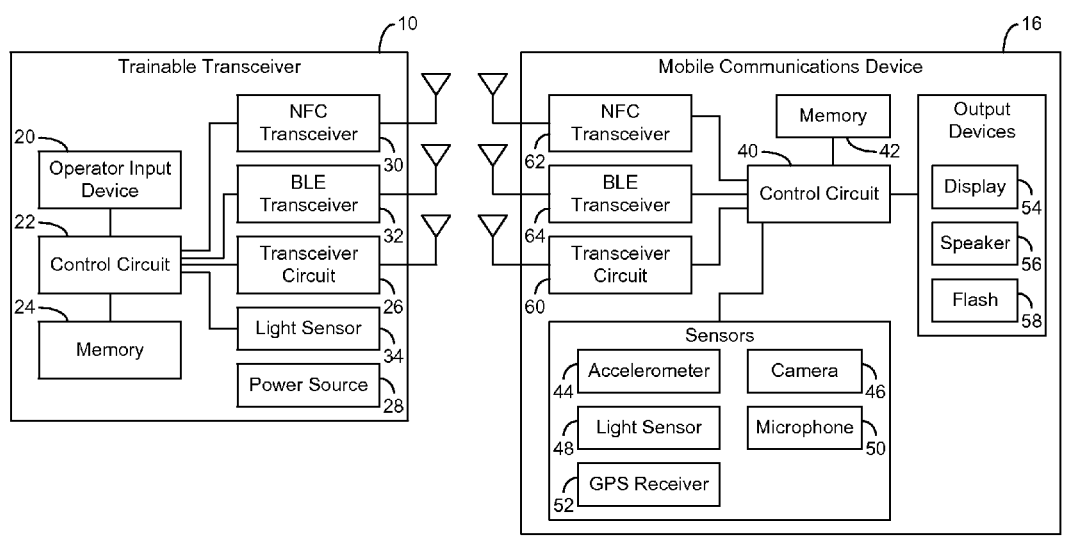
FIG. 2A illustrates a trainable transceiver and a mobile communications device including components for communication using radio frequency transmissions and light transmissions according to an exemplary embodiment.

Referring now to FIG. 2A, an exemplary embodiment of the trainable transceiver 10 is illustrated along with an exemplary embodiment of the mobile communications device 16. In one embodiment, the trainable transceiver 10 includes an operator input device 20. The operator input device 20 may be one or more buttons. For example, the operator input device 20 may be three hard key buttons. In some embodiments, the operator input device 20 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action. In additional embodiments, the operator input device 20 may display data to a user or other provide outputs. For example, the operator input device 20 may include a display screen (e.g., a display as part of a touchscreen, liquid crystal display, e-ink display, plasma display, light emitting diode (LED) display, or other display device), speaker, haptic feedback device (e.g., vibration motor), LEDs, or other hardware component for providing an output. In some embodiments, the operator input device 20 is connected to a control circuit 22. The control circuit 22 may send information and or control signals or instructions to the operator input device 20. For example, the control circuit 22 may send output instructions to the operator input device 20 causing the display of an image. The control circuit 22 may also receive input signals, instructions, and/or data from the operator input device 20.

The control circuit 22 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 22 may be a SoC individually or with additional hardware components described herein. The control circuit 22 may further include, in some embodiments, memory (e.g., random access memory, read only memory, flash memory, hard disk storage, flash memory storage, solid state drive memory, etc.). In further embodiments, the control circuit 22 may function as a controller for one or more hardware components included in the trainable transceiver 10. For example, the control circuit 22 may function as a controller for a touchscreen display or other operator input device 20, a controller for a transceiver, transmitter, receiver, or other communication device (e.g., implement a Bluetooth communications protocol).

In some embodiments, the control circuit 22 receives inputs from operator input devices 20 and processes the inputs. The control circuit may control a transceiver circuit 26 and use the transceiver circuit 26 to communicate (e.g., receive signals and/or transmit signals) with one or more of original transmitters 14, home electronic devices 12, mobile communications devices 16, and/or remote devices. The control circuit 22 may also be used to in the training process.

The control circuit 22 is coupled to memory 24. The memory 24 may be used to facilitate the functions of the trainable transceiver described herein. Memory 24 may be volatile and/or non-volatile memory. For example, memory 24 may be random access memory, read only memory, flash memory, hard disk storage, flash memory storage, solid state drive memory, etc. In some embodiments, the control circuit 22 reads and writes to memory 24. Memory 24 may include computer code modules, data, computer instructions, or other information which may be executed by the control circuit 22 or otherwise facilitate the functions of the trainable transceiver 10 described herein. For example, memory 24 may include encryption codes, pairing information, identification information, a device registry, etc.

The transceiver circuit 26 allows the trainable transceiver 10 to transmit and/or receive wireless communication signals. The wireless communication signals may be transmitted to or received from a variety of wireless devices (e.g., the original transmitter 14, home electronic device 12, mobile communications device 16, and/or remote device). The transceiver circuit 26 may be controlled by the control circuit 22. For example, the control circuit 22 may turn on or off the transceiver circuit 26, the control circuit 22 may send data using the transceiver circuit 26, format information, an activation signal, control signal, and/or other signal or data for transmission via the transceiver circuit 26, or otherwise control the transceiver circuit 26. Inputs from the transceiver circuit 26 may also be received by the control circuit 22. In some embodiments, the transceiver circuit 26 may include additional hardware such as processors, memory, integrated circuits, antennas, etc. The transceiver circuit 26 may process information prior to transmission or upon reception and prior to passing the information to the control circuit 22. In some embodiments, the transceiver circuit 26 may be coupled directly to memory 24 (e.g., to store encryption data, retrieve encryption data, etc.). In further embodiments, the transceiver circuit 26 may include one or more transceivers, transmitters, receivers, etc. For example, the transceiver circuit 26 may include an optical transceiver, near field communication (NFC) transceiver, etc. In some embodiments, the transceiver circuit 26 may be implemented as a SoC.

In further embodiments, the control circuit 22 is coupled to additional transceiver circuits, receivers, and/or transmitters. In one embodiment, the transceiver circuit 26 is used for communicating with (transmitting to and/or receiving from) home electronic devices and/or remote devices. In some embodiments, the transceiver circuit 26 may be or include a cellular transceiver. The trainable transceiver 10 may use the transceiver circuit 26 and/or an additional transceiver (e.g., a cellular transceiver) to access the internet, other networks, and/or network hardware. In other embodiments, the trainable transceiver 10 may access the internet, other networks, and/or network hardware through an intermediate device in communication with the trainable transceiver 10 such as the mobile communications device 16.

Additional transceivers may be used to communicate with other devices (e.g., mobile communications devices, cameras, network devices, or other wireless devices). The transceiver circuit 26 and other transceivers may operate using different frequency, transmission spectrums, protocols, and/or otherwise transmit and/or receive signals using different techniques. For example, the transceiver circuit 26 may be configured to send activation signals to the home electronic device 12 (e.g., a garage door opener) using an encrypted radio wave transmission and an additional transceiver may communicate with a mobile communications device (e.g., a smartphone) using a Bluetooth transceiver and Bluetooth communications protocol.

The trainable transceiver 10 may communicate with original transmitters 14, home electronic devices 12, remote devices, mobile communications devices 16, network devices, and/or other devices as described above using the transceiver circuit and/or other additional transceiver circuits or hardware. The devices with which the trainable transceiver communicates may include transceivers, transmitters, and/or receivers. The communication may be one-way or two-way communication.

With continued reference to FIG. 2A, the trainable transceiver 10 may include a power source 28. The power source 28 provides electrical power to the components of the trainable transceiver 10. In one embodiment, the power source 28 is self-contained. For example, the power source 28 may be a battery, solar cell, or other power source not requiring a wired connection to another source of electrical power. In other embodiments, the power source 28 may be a wired connection to another power source. For example, the power source 28 may be a wired connection to a vehicle power supply system. The power source 28 may be integrated into the vehicle electrical system. This may allow the trainable transceiver 10 to draw electrical power from a vehicle battery, be turned on or off by a vehicle electrical system (e.g., turned off when the vehicle is turned off, turned on when a vehicle door is opened, etc.), draw power provided by a vehicle alternator, or otherwise be integrated with the electrical power systems(s) of the vehicle.

In some embodiments, the trainable transceiver 10 includes a near field communication (NFC) transceiver 30. The NFC transceiver 30 may be used to communicate with the mobile communications device 16 and/or other device. For example, the NFC transceiver 30 may be used to pair the mobile communications device 16 such as a smartphone and the trainable transceiver 10. The pairing process may be conducted using NFC. In some embodiments, additional information may be communicated between the trainable transceiver 10 and the mobile communications device 16 and/or other device using NFC.

In some embodiments, the trainable transceiver 10 includes a Bluetooth Low Energy (BLE) transceiver 32. The BLE transceiver 32 may be a radio frequency transceiver configured to communicate using the Bluetooth Low Energy protocol. In other embodiments, the BLE transceiver 32 may be a radio frequency transceiver configured to communicate using a different protocol, such as a Bluetooth protocol (e.g., v2.0, v3.0, v4.0, etc.). The BLE transceiver 32 may facilitate pairing of the trainable transceiver 10 and the mobile communications device 16. For example, the trainable transceiver 10 and mobile communications device 16 may establish a communication connection using the BLE transceiver 32 and exchange information relevant to pairing the two devices for further communication using a BLE protocol. Upon pairing (e.g., using the BLE transceiver 32, NFC transceiver 30, and/or other techniques), the trainable transceiver 10 may communicate with the mobile communications device 16 using the BLE transceiver 32.

The mobile communications device 16, which may communicate with the trainable transceiver 10 in some embodiments of the trainable transceiver 10, may be a device purchased by a consumer separately from the trainable transceiver 10. For example, the mobile communications device 16 may be a cell phone purchased from a third party retailer. In some embodiments, the mobile communications device 16 (e.g., smartphone, tablet, cellular telephone, laptop, key fob, dongle, etc.) includes a control circuit 40. The control circuit 40 may contain circuitry, hardware, and/or software for facilitating and/or performing the functions described herein. The control circuit 40 may handle inputs, process inputs, run programs, handle instructions, route information, control memory, control a processor, process data, generate outputs, communicate with other devices or hardware, and/or otherwise perform general or specific computing tasks. In some embodiments, the control circuit 40 includes a processor. In some embodiments, the control circuit 40 includes memory. The control circuit 40 may handle computation tasks associated with placing phone calls, running an operating system, running applications, displaying information, general computing, and/or tasks associated with providing smartphone, tablet, laptop and/or other device functions. In some embodiments, the control circuit 40 may include and/or be one more systems on a chip (SoCs), application specific integrated circuits (ASICs), one or more field programmable gate arrays (FPGAs), a digital-signal-processor (DSP), a group of processing components, and/or other suitable electronic processing components.

The mobile communications device 16 may include memory 42. Memory 42 is one or more devices (e.g. RAM, ROM, Flash Memory, hard disk storage, etc.) for storing data and/or computer code for facilitating the various processes described herein. Memory 42 may be or include non-transient volatile memory or non-volatile memory. Memory 42 may include database components, object code components, script components, or any other type of information structure for supporting various activities and information structures described herein. Memory 42 may be communicably connected to the control circuit 40 and provide computer code and/or instructions to the control circuit 40 for executing the processes described herein. For example, memory 42 may contain computer code, instructions, and/or other information of implementing an operating system, one or more applications, and/or other programs.

In some embodiments, the mobile communications device 16 includes one or more sensors. The sensors may be controlled by the control circuit 40, provide inputs to the control circuit 40, and/or otherwise interact with the control circuit 40. In some embodiments, sensors include one or more accelerometers 44, cameras 46, light sensors 48, microphones 50, and/or other sensors or input devices. Sensors may further include a global positioning system (GPS) receiver 52. The GPS receiver 52 may receive position information from another source (e.g., a satellite). The position may be based on GPS coordinates.

The mobile communications device 16 may include output devices. In some embodiments, the output devices are controlled by the control circuit 40, provide input to the control circuit 40, communicate output from the control circuit 40 to a user or other device, and/or are otherwise in communication with the control circuit 40. Output devices may include a display 54. The display 54 allows for visual communication with a user. The display 54 may be configured to output a visual representation based on computer instructions, control signals, computer code, frame buffers, and/or other electronic signals or information. In some embodiments, the display 54 includes a graphics processing unit (GPU), controller, and/or other hardware to facilitate the handling of and display of graphics information. In other embodiments, the display 54 does not include hardware for processing images or image data. The display 54 may be any hardware configured to display images using the emission of light or another technique. For example, the display 54 may be a liquid crystal display, e-ink display, plasma display, light emitting diode (LED) display, or other display device. In some embodiments, the display 54 may be part of or otherwise integrated with a user input device such as a touchscreen display (e.g., projected capacitance touchscreen, resistance based touchscreen, and/or touchscreen based on other touch sensing technology). The 54 display may be a touchscreen display. Output devices may also include a speaker 56 for providing audio outputs. Output devices may further include a flash 58. The flash 58 may be associated with the camera 46 and may be an LED or other light source.

The mobile communications device 16 may include a transceiver circuit 60. The transceiver circuit 60 may be a radio frequency transceiver, cellular transceiver, and/or other transceiver. The transceiver circuit 60 may provide communication between the mobile communications device 16 and a cell tower, voice network, data network, communication network, other device, and/or other hardware components used in communication. The mobile communications device 16 may access the internet and/or other networks using the transceiver circuit 60. In some embodiments, the trainable transceiver 10 and mobile communications device 16 communicate using the transceiver circuit 60 of the mobile communications device 16 and the transceiver circuit 26 of the trainable transceiver 10. Other intermediary devices and/or hardware (e.g., network components) may facilitate communication between the mobile communications device 16 and the trainable transceiver 10. In some embodiments, the mobile communications device 16 may have access to activation signal parameters, training information (e.g., device identification information), and/or other information related to the home electronics device 12 and/or remote device. The mobile communications device 16 may have access to this information through a variety of sources and techniques as discussed in more detail herein. The mobile communications device 16 may transmit activation signal parameters, training information (e.g., device identification information), and/or other information related to the home electronics device 12 and/or remote device using the transceiver circuit 60 of the mobile communications device 16. This information may be received by the trainable transceiver 10 using the transceiver circuit 26 of the trainable transceiver 10.

In some embodiments, the mobile communications device 16 includes an NFC transceiver 62. The NFC transceiver 62 may allow the mobile communications device to wirelessly communicate with the trainable transceiver 10 using NFC. As discussed above, the NFC transceiver 62 of the mobile communications device 16 and the NFC transceiver 30 of the trainable transceiver 10 may allow for wireless communication between the trainable transceiver 10 and the mobile communications device 16. In some embodiments, the wireless communication via the NFC transceivers allows for the trainable transceiver 10 and mobile communications device 16 to be paired and therefore allow for further communication using the NFC transceivers and/or other transceivers described herein. In some embodiments, the mobile communications device 16 may have access to activation signal parameters, training information (e.g., device identification information), and/or other information related to the home electronics device 12 and/or remote device. The mobile communications device 16 may have access to this information through a variety of sources and techniques as discussed in more detail herein. The mobile communications device 16 may transmit activation signal parameters, training information (e.g., device identification information), and/or other information related to the home electronics device 12 and/or remote device using the NFC transceiver 62 of the mobile communications device 16. This information may be received by the trainable transceiver 10 using the NFC transceiver 30 of the trainable transceiver 10.

In some embodiments, the mobile communications device 16 includes a BLE transceiver 64. The BLE transceiver 64 may allow the mobile communications device 16 to wirelessly communicate with the trainable transceiver 10 using a Bluetooth protocol such as BLE. As discussed above, the BLE transceiver 64 of the mobile communications device 16 and the BLE transceiver 32 of the trainable transceiver 10 may allow for wireless communication between the trainable transceiver 10 and the mobile communications device 16. In some embodiments, the wireless communication via the BLE transceivers allows for the trainable transceiver 10 and mobile communications device 16 to be paired and therefore allow for further communication using the BLE transceivers and/or other transceivers described herein. Alternatively, the trainable transceiver 10 and the mobile communications device 16 may be paired by another technique (e.g., using the NFC transceivers) which allows for further communication using BLE transceivers. In some embodiments, the mobile communications device 16 may have access to activation signal parameters, training information (e.g., device identification information), and/or other information related to the home electronics device 12 and/or remote device. The mobile communications device 16 may have access to this information through a variety of sources and techniques as discussed in more detail herein. The mobile communications device 16 may transmit activation signal parameters, training information (e.g., device identification information), and/or other information related to the home electronics device 12 and/or remote device using the BLE transceiver 64 of the mobile communications device 16. This information may be received by the trainable transceiver 10 using the BLE transceiver 32 of the trainable transceiver 10.

With continued reference to FIG. 2A, the trainable transceiver may include a light sensor 34 (e.g., photodetector) in some embodiments. As described above, the mobile communications device 16 may include the light sensor 48 and the display 54, flash 58, and/or other light source. The light sensor 3464 of the trainable transceiver 10 may be configured to receive information transmitted from a source, such as the mobile communications device 16, using light. The mobile communications device 16 may communicate with the trainable transceiver 10 through one way communication. For example, the mobile communications device 16 may use a visible light communication protocol to transmit information to the trainable transceiver 10. In other embodiments, the trainable transceiver 10 may include a light source, and the trainable transceiver 10 and mobile communications device 16 may communicate with two way communication. In alternative embodiments, a different light spectrum is used to communicate. For example, ultraviolet light, infrared light, and/or other spectra of light may be used for communication between the mobile communications device 16 and the trainable transceiver 10. Communication between the mobile communications device 16 and the trainable transceiver 10 using one or more light sources and one or more light sensors may be based on such techniques and/or parameters as modulation of the light source, turning on and off a light source, the frequency with which the light source is turned on and off, the duration for which the light source is illuminated, the wavelength of light produced by the light source, the intensity of the light produced by the light source, and/or other techniques or parameters used to communicate using light. The mobile communications device 16 and trainable transceiver 10 may communicate using free-space optical communication techniques. In some embodiments, data is encoded onto light emitted by the light source through modulation of the light source (e.g., frequency modulation, amplitude modulation, etc.).

For example, the mobile communications device may flash a light source such as the LED flash 58 associated with the camera 46, the display 54, and/or other light source to communicate data and/or information to the trainable transceiver 10. The trainable transceiver 10 may receive the flashes of light produced by the light source of the mobile communications device 16 using the light sensor 34. The control circuit 22 may receive sensor data from the light sensor 34, output from the light sensor 34, and/or other signals or information from the light sensor 34. The control circuit 22 may interpret, decode, and/or otherwise analyze the signal from the light sensor 34 to determine the information sent by the mobile communications device 16. In some embodiments, the control circuit 22 and/or a program in memory 24 may be configured to determine if a communication signal is being received by the light sensor 34. For example, the control circuit 22 may record a signal from the light sensor 34 and determine if a tag, pattern, and/or other feature of the light sensor 34 output indicates that a signal is being received. The same techniques may be used by the mobile communications device 16 in order to receive a light based communication from the trainable transceiver 10.

In some embodiments, the mobile communications device 16 may have access to activation signal parameters, training information (e.g., device identification information), and/or other information related to the home electronics device 12 and/or remote device. The mobile communications device 16 may have access to this information through a variety of sources and techniques as discussed in more detail herein. The mobile communications device 16 may transmit activation signal parameters, training information (e.g., device identification information), and/or other information related to the home electronics device 12 and/or remote device using a light source of the mobile communications device 16. This information may be received by the trainable transceiver 10 using the light sensor 34 of the trainable transceiver 10. In some embodiments, the trainable transceiver 10 may use a light transmission technique described herein to transmit activation signal parameters, training information (e.g., device identification information), and/or other information related to the home electronics device 12 and/or remote device to the mobile communications device 16. In some embodiments, other information related to the home electronics device 12 and/or remote device to the mobile communications device 16 may include information such as the status of the device, diagnostic information related to the device, notifications, data, and/or other information. In further embodiments, the mobile communications device 16 may have access to information about itself (e.g., notifications, application related information, data, and/or other information) and/or information about a device such as the home electronics device 12, remote device, and/or other device. For example, the mobile communications device 16 may receive this information using a transceiver and/or internet access. The mobile communications device 16 may transmit this information using light according to one or more of the techniques described herein.

Figure 2B:
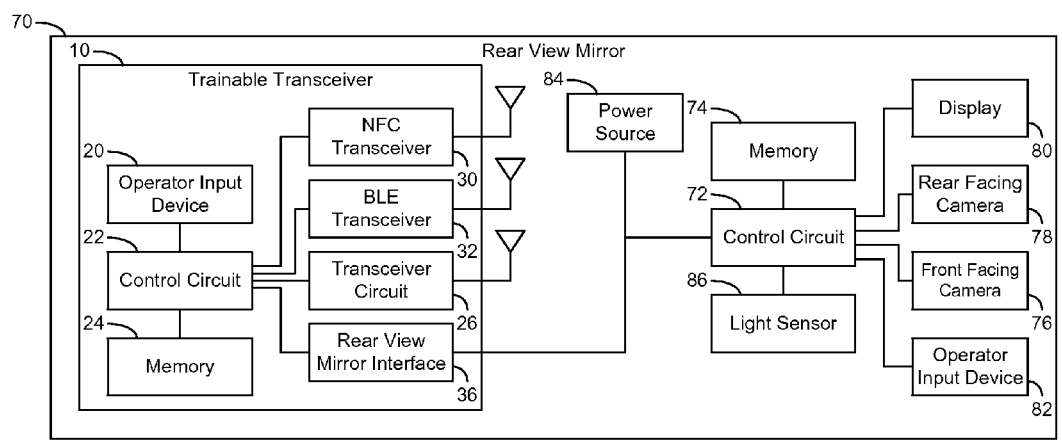
FIG. 2B illustrates a trainable transceiver integrated with a rear view mirror of a vehicle including a light sensor according to an exemplary embodiment.

Referring now to FIG. 2B, the trainable transceiver 10 may be coupled to, integrated with, and/or otherwise be in communication with a rear view mirror 70 of the vehicle. Advantageously, this may allow the trainable transceiver 10 to use hardware associated with the rear view mirror 70 rather than duplicating the same hardware for use with the trainable transceiver 10. This may save cost, simplify the manufacturing process, and/or otherwise improve the trainable transceiver system. The rear view mirror 70 may be installed in a vehicle as part of an original vehicle manufacturing process, as an additional piece of hardware, as part of a retrofit instillation, to replace an existing mirror, or otherwise be added to a vehicle. The rear view mirror 70 may be uninstalled in a vehicle (e.g., packaged for sale for later installation in a vehicle).

In one embodiment, the rear view mirror 70 includes a control circuit 72. The control circuit 72 may contain circuitry, hardware, and/or software for facilitating and/or performing the functions described herein. The control circuit 72 may handle inputs, process inputs, run programs, handle instructions, route information, control memory, control a processor, process data, generate outputs, communicate with other devices or hardware, and/or otherwise perform general or specific computing tasks. In some embodiments, the control circuit 72 includes a processor. The processor may be implemented as a general-purpose processor, an application specific integrated circuit (ASIC), one or more field programmable gate arrays (FPGAs), a digital-signal-processor (DSP), a group of processing components, or other suitable electronic processing components.

In some embodiments, the control circuit 72 is coupled to memory 74. Memory 74 is one or more devices (e.g. RAM, ROM, Flash Memory, hard disk storage, etc.) for storing data and/or computer code for facilitating the various processes described herein. Memory 74 may be or include non-transient volatile memory or non-volatile memory. Memory 74 may include database components, object code components, script components, or any other type of information structure for supporting various activities and information structures described herein. Memory 74 may be communicably connected to the control circuit 72 and provide computer code or instructions to the control circuit 72 for executing the processes described herein.

In some embodiments, the rear view mirror 70 includes one or more front facing cameras 76 and/or one or more rear facing cameras 78. The front facing camera 76 may be used alone or in conjunction with the control circuit 72 of the rear view mirror 70 to perform a variety of functions. For example, the front facing camera 76 may be used to provide driver aids such as automatically dimming headlights when oncoming cars are detected (e.g., by the headlights of the oncoming car), detecting if the vehicle is in its own lane, detecting rain or other weather, detecting a possible collision with another vehicle or object, recognizing traffic signs (e.g., extracting information from an image including a traffic sign), detecting pedestrians, and/or otherwise assisting a driver. The rear facing camera 78 may be used alone or in conjunction with a control circuit 72 of the rear view mirror 70 to perform a variety of functions. For example, the rear facing camera 78 may be used as a backup camera, to detect objects behind the vehicle, provide an image of the vehicle surroundings while reversing, detect light in relation to an auto dimming feature of the mirror, and/or to otherwise assist a driver of the vehicle. In further embodiments, the rear view mirror 70 includes a camera which is positioned to record images of the interior of the vehicle.

In some embodiments, the front facing camera 76 is integrated with the housing or another portion of the rear view mirror 70. For example, the front facing camera 76 may be located within the portion of the housing behind the mirror. Alternatively, the front facing camera 76 may be located in a portion of the rear view mirror housing which connects the mirror to the windshield and/or head liner. The front facing camera 76 may be protected by the housing which contacts the windshield at locations surrounding the front facing camera 76. The rear facing camera 78 may be integrated with the housing of the rear view mirror 70 such that the rear facing camera 78 has a line of sight to the rear window of the vehicle.

In one embodiment, the rear view mirror 70 includes a display 80. The display 80 allows for visual communication with a user. The display 80 may be configured to output a visual representation based on computer instructions, control signals, computer code, frame buffers, and/or other electronic signals or information. In some embodiments, the display 80 includes a graphics processing unit (GPU), controller, and/or other hardware to facilitate the handling of and display of graphics information. In other embodiments, the display 80 does not include hardware for processing images or image data. The display 80 may be any hardware configured to display images using the emission of light or another technique. For example, the display 80 may be a liquid crystal display, e-ink display, plasma display, light emitting diode (LED) display, or other display device. In some embodiments, the display 80 may be part of or otherwise integrated with a user input device such as a touchscreen display (e.g., projected capacitance touchscreen, resistance based touchscreen, and/or touchscreen based on other touch sensing technology). The display 80 be a touchscreen display. In some embodiments, the display 80 is controlled by the control circuit 72 of the rear view mirror 70. The display 80 may be used for functions such as displaying weather information, backup camera video feeds, warnings, compass heading, road information (e.g., current speed limit), navigation information, vehicle information (e.g., if a passenger is not wearing a seat belt), or information accessible by the vehicle and/or a vehicle connected device (e.g., paired smartphone). The display 80 may be located behind the glass of the mirror assembly itself. The display 80 may be used to display images but, when not in use, function as part of the mirror, allowing a user to see towards the rear of the vehicle.

In some embodiments, the rear view mirror includes an operator input device 82. The operator input device 82 may allow a user to provide inputs to the control circuit 72 of the rear view mirror 70. The operator input device 82 may include soft keys (touch screens, projected capacitance based buttons, resistance based buttons, etc.) and/or hard keys (e.g., buttons, switches knobs, etc.), microphones, and/or other hardware configured to accept user inputs. The operator input device 82 may allow a user to control functions associated with the rear view mirror 70 such as dimming, turning on or off auto dimming, placing an emergency call, etc. The operator input device 82 of the rear view mirror 70 is coupled to the control circuit 72 of the rear view mirror 70. The rear view mirror 70 may process inputs received from the operator input device 82 (e.g., change the display, dim the mirror, play a sound using the speaker, or otherwise take an action, process the input, and/or generate an output).

In one embodiment, the rear view mirror includes a power source 84. The power source 84 may be a replaceable or rechargeable battery. In other embodiments, the power source 84 may be a connection to a vehicle electrical system. For example, the components of the rear view mirror 70 may draw electrical power from a controller area network (CAN) bus, vehicle battery, vehicle alternator, and/or other vehicle system to which the components of the rear view mirror 70 are electrically connected.

In some embodiments, the rear view mirror 70 includes an integral transceiver, such as a cellular transceiver, Bluetooth transceiver, etc., or a connection to a transceiver coupled to the vehicle in which the rear view mirror 70 is or will be mounted. Using this transceiver and/or additional hardware, the rear view mirror 70 may have or be capable of providing access to the internet and/or communication to other devices and/or hardware (e.g., using radio frequency transmissions).

The rear view mirror 70 may include one or more sensors. For example, the rear view mirror 70 may include light sensors 86, temperature sensors, accelerometers, humidity sensors, microphones, and/or other sensors. Sensors may be used to display information to an occupant of vehicle (e.g., current weather conditions) using the display 80 of the rear view mirror 70 and/or other displays in the vehicle (e.g., center stack display, gauge cluster display, heads up display (HUD), etc.). Sensors may also be used to accept user input and/or measure parameters related to the vehicle. For example, the microphone may be used to accept voice commands from an occupant of the vehicle. The accelerometer may be used to measure vehicle dynamics and/or accept physical inputs from a user moving, adjusting, coming into contact with, bumping, shaking, or otherwise manipulating the rear view mirror 70. In some embodiments, the light sensor 86 is used in conjunction with an auto dimming feature of the rear view mirror 70. The light sensor 86 may measure ambient light, direct light, detect light from headlights, detect light from other sources, and/or otherwise be configured to measure the presence or absence of light and/or the intensity of light. Sensor data may be processed, received, sent to other hardware, and/or otherwise manipulated by the control circuit 72 of the rear view mirror 70. For example, the control circuit 72 may receive sensor readings from one or more light sensors 86. The control circuit 72 may determine if the mirror should be auto dimmed based on information from the light sensor 86. For example, the control circuit 72 may determine if it is night or day using ambient light readings, an average light intensity for a period of time (e.g., the last hour), and/or other techniques. In some embodiments, the control circuit 72 of the rear view mirror 70 may transmit, communicate, and/or otherwise pass sensor data, signals, outputs, and/or other information to other hardware (e.g., the trainable transceiver 10).

With continued reference to FIG. 2B, the trainable transceiver 10 includes a rear view mirror interface 36 in some embodiments. The rear view mirror interface 36 may allow for communication between the trainable transceiver 10 and the control circuit 72 of the rear view mirror 70. In one embodiment, rear view mirror interface 36 includes physical connection such as ports, connectors, wiring, and/or other hardware used to create an electrical connection between the control circuit 22 of the trainable transceiver 10 and the control circuit 72 of the rear view mirror 70. In alternative embodiments, the control circuit 22 of the trainable transceiver 10 and the control circuit 72 of the rear view mirror 70 are directly connected (e.g., wired such that outputs from one control circuit are received as inputs at the other control circuit and/or vice versa). In further embodiments, the rear view mirror interface 36 may include and/or be implemented by computer programming, code, instructions, or other software stored in memory in the trainable transceiver 10 and/or rear view mirror 70. Advantageously, the connection between the trainable transceiver 10 and the rear view mirror 70 may allow for components of the rear view mirror 70 to serve two or more functions thus increasing the usefulness of these components, reducing cost, and/or eliminating the need for duplicate components to provide additional functions to the trainable transceiver 10. For example, the display 80 of the rear view mirror 70 may be used to communicate information relevant to the operation of the rear view mirror 70 (e.g., weather information, if the mirror is set to automatically dim, vehicle warnings, etc.) and information relevant to the trainable transceiver 10 (e.g., training steps, pairing information, whether an activation signal has been received, status information regarding a home electronics device, mobile communications device, and/or remote device, and/or other information related to the trainable transceiver 10).

The connection between the trainable transceiver 10 and the rear view mirror hardware may allow the trainable transceiver 10 to control the hardware included in the rear view mirror 70, send control signals and/or instructions to the control circuit 72 of the rear view mirror 70, receive images and/or image data from the camera(s) 76 and/or 78 included in the rear view mirror 70 (e.g., via the control circuit 72 of the rear view mirror), receive control signals and/or instructions, receive sensor information from sensors included in the rear view mirror 70 (e.g., via the control circuit 72 of the rear view mirror 70), and/or otherwise interact with the rear view mirror 70 and/or components thereof.

The trainable transceiver 10 may be configured to control, communicate, or otherwise operate in conjunction with the control circuit 72 of the rear view mirror 70 to facilitate and/or perform the functions described herein. In one embodiment, the trainable transceiver 10 communicates with the control circuit 72 of the rear view mirror 70 through the rear view mirror interface 36. In other embodiments, the trainable transceiver 10 communicates with the control circuit 72 of the rear view 70 mirror directly (e.g., the control circuit 22 of the trainable transceiver communicates with the control circuit of the rear view mirror). The trainable transceiver may communicate and/or control the control circuit of the rear view mirror using a variety of techniques. For example, the trainable transceiver may communicate with the rear view mirror through outputs from the trainable transceivers received as inputs at the control circuit of the rear view mirror, sending the rear view mirror a location in memory which contains information instructions, data, or other information which is read by the control circuit of the rear view mirror, sending the control circuit of the rear view mirror data, instructions, or other information through a bus, port, or other connection, or otherwise providing instructions, data, or information to the control circuit of the rear view mirror.

In some embodiments, the control circuit 72 of the rear view mirror 70 communicates with the control circuit 22 of the trainable transceiver 10 using similar techniques. In other embodiments, the communication is one way with the trainable transceiver 10 sending instructions, data, or other information to the control circuit 72 of the rear view mirror 70. The trainable transceiver 10 may extract data, instructions, or other information from the control circuit 72 of the rear view mirror 70 by reading the memory 74 of the rear view mirror 70 and/or requesting from the control circuit 72 of the rear view mirror 70 an address for a location in memory 74 in which the relevant information can be read. Alternatively, the control circuit 72 of the rear view mirror 70 may send information to the trainable transceiver 10 but only when requested by the trainable transceiver 10.

In one embodiment, the trainable transceiver 10 is configured to provide output to a vehicle occupant using the display 80 and/or speaker of the rear view mirror 70. The trainable transceiver 10 may control the output of the rear view mirror 70 by sending control signals, instructions, information, and/or data to the rear view mirror 70 or otherwise control the display 80 and/or speaker of the rear view mirror 70. In one embodiment, the trainable transceiver 10 controls the output of the rear view mirror 70 using the rear view mirror interface 36. For example, the rear view mirror interface 36 may format instructions, control signals, and/or information such that it can be received and/or processed by the control circuit 72 of the rear view mirror 70. In other embodiments, the control circuit 22 of the trainable transceiver 10 may communicate directly with the control circuit 72 of the rear view mirror 70. The control circuit 72 of the rear view mirror 70 may handle, process, output, forward and/or otherwise manipulate instructions, control signals, data, and/or other information from the trainable transceiver 10. In other embodiments, the control circuit 72 of the rear view mirror 70 forwards, routes, or otherwise directs the instructions, control signals, outputs, data, and/or other information to other components of the rear view mirror 70 without additional processing or manipulation. For example, the trainable transceiver 10 may output a frame buffer to the control circuit 72 of the rear view mirror 70 which then routes the frame buffer to the display 80 without further manipulation. This may include storing the frame buffer in memory included in the control circuit 72 of the rear view mirror 70 and sending an address corresponding to the frame buffer to the display 80. As described in greater detail with respect to later figures, the display 80 may be used by the trainable transceiver 10 to communicate information to a vehicle occupant regarding the home electronics device 12, remote device, mobile communications device 16, or other device controlled by and/or in communication with the trainable transceiver 10.

Advantageously, displaying information related to the trainable transceiver 10 using the display 80 of the rear view mirror 70 may make a user more likely to view the information. Vehicle occupants, particularly the driver, are accustomed to looking at the rear view mirror 70 frequently. A vehicle driver may be particularly likely to look at the rear view mirror 70 while reversing out of a garage and/or down a driveway. As such, a vehicle driver is more likely to see information from the trainable transceiver 10 related to the home electronics device 12 (e.g., a garage door opener) if the information is displayed on the rear view mirror 70 rather than in another location.

The same or similar techniques as described above may be used to control a speaker of the rear view mirror 70 for use with the trainable transceiver 10. As described in greater detail with respect to later figures, the speaker may be used by the trainable transceiver 10 to communicate information to a vehicle occupant regarding the home electronics device 12, remote device, mobile communications device 16, or other device controlled by and/or in communication with the trainable transceiver 10.

The trainable transceiver 10 may be configured to receive inputs from the sensors of the rear view mirror and/or control sensors of the rear view mirror 70. The trainable transceiver 10 may access sensor data and/or control sensor data through the rear view mirror interface 36 and/or the control circuit 72 of the rear view mirror 70. In other embodiments, sensor data may be accessed and/or sensors controlled by the control circuit 22 of the trainable transceiver 10 and/or the control circuit 72 of the rear view mirror 70. The trainable transceiver 10 may receive sensor data and process, transmit, format, send data to other devices, and/or otherwise manipulate the sensor data. The trainable transceiver 10 may also control sensors. For example, the trainable transceiver 10 may turn sensors on or off, calibrate sensors, and/or otherwise manipulate sensors. In some embodiments, the trainable transceiver 10 receives commands, instructions, data, and/or other information through one or more sensors. For example, the trainable transceiver 10 may receive voice commands from a user through the microphone. Continuing the example, data may be optically received using the light sensor. In some embodiments, the trainable transceiver 10 receives information (e.g., information input through physical interaction with the rear view mirror 70) through the accelerometer of the rear view mirror.

In some embodiments, the trainable transceiver 10 receives inputs from the operator input device 82 of the rear view mirror 70 (e.g., via the control circuit 72 of the rear view mirror 70 and/or the rear view mirror interface 36). The trainable transceiver 10 may send a control signal, instructions, information or otherwise communicate with the control circuit 72 of the rear view mirror 70 to cause inputs to be communicated to the trainable transceiver 10. The trainable transceiver 10 may use the operator input device 82 of the rear view mirror 70 to augment or replace the operator input device 20 associated with the trainable transceiver 10.

In some embodiments, the trainable transceiver 10 draws electrical power through a connection with the power source 84 included in the rear view mirror 70. As explained above, the power source 84 may provide power to the rear view mirror 70 from the electrical system of the vehicle and/or a battery. The trainable transceiver 10 may draw power from the power source 84 as well. For example, the trainable transceiver 10 may be connected to the power source 84 through the rear view mirror interface 36. Alternatively, components of the trainable transceiver 10 may draw power from direct connections to the power source 84. In other embodiments, the trainable transceiver 10 draws power from the control circuit 72 of the rear view mirror 70 which in turn draws power from the power source 84.

In one embodiment, the trainable transceiver 10 may use a transceiver included in the rear view mirror 70 and/or coupled to the rear view mirror 70 (e.g., a transceiver mounted in the vehicle) to send and/or receive activation signals, control signals, images, image data, and/or other information. For example, the trainable transceiver 10 may configure the transceiver and/or control circuit 72 of the rear view mirror 70 such that the trainable transceiver 10 has access to the internet, other networks, and/or networking hardware. In some embodiments, the trainable transceiver 10 may use a transceiver associated with the rear view mirror 70 to access other devices (e.g., home electronic devices, remote devices, mobile communications devices, networking devices, etc.).

The trainable transceiver 10 may be physically attached to or otherwise included in the rear view mirror 70. In one embodiment, the trainable transceiver 10 may be added to or otherwise installed by wiring the rear view mirror interface 36 and/or other components to one or more components of the rear view mirror 70 (e.g., the power supply, and/or control circuit). As part of a retrofit instillation, the trainable transceiver 10 may be physically coupled to the rear view mirror 70. For example, a housing containing one or more components of the trainable transceiver 10 may be coupled to a housing of the rear view mirror 70. In other embodiments, the trainable transceiver 10 (e.g., one or more components of the trainable transceiver 10) may be a module or package included within the housing of the rear view mirror 70. For example, the trainable transceiver 10 may be attached to rear view mirror hardware (e.g., the rear view mirror interface 36 wired to the power source 84 and/or control circuit 72 of the rear view mirror 70), and the trainable transceiver 10 and rear view mirror hardware placed within a single housing.

Referring now to FIGS. 2A and 2B, the trainable transceiver 10 and mobile communications device 16 may communicate using a light sensor and/or camera included in the rear view mirror 70 of a vehicle. As depicted in FIG. 2B and explained in reference thereto, the trainable transceiver 10 may receive output, data, signals, and/or other information from a light sensor and/or camera included in a rear view mirror 70 with which the trainable transceiver 10 is coupled or otherwise integrated. The trainable transceiver 10 may also control hardware such as a light source (e.g., display 80) included in the rear view mirror 70 using the techniques described above with reference to FIG. 2B. Using the hardware and/or techniques described with reference to FIG. 2B, the mobile communications device 16 and trainable transceiver 10 may communicate using light according to one or more of the techniques described with reference to FIG. 2A. For example, a user may communicate activation signal parameters, training information (e.g., device identification information), and/or other information related to the home electronics device 12 and/or remote device to the trainable transceiver 10 by producing light with a flash. The light may be sensed by the light sensor 86 included in the rear view mirror 70 and a signal, output, data, and/or other information from the light sensor 86 may be provided to or retrieved by the control circuit 22 of the trainable transceiver 10 (e.g., through a rear view mirror interface 36). The control circuit 22 of the trainable transceiver 10 may then analyze the signal, output, data, and/or other information form the light sensor to determine activation signal parameters, training information (e.g., device identification information), and/or other information related to the home electronics device 12 and/or remote device sent by the mobile communications device 16 using the light transmission.

Figure 2C:
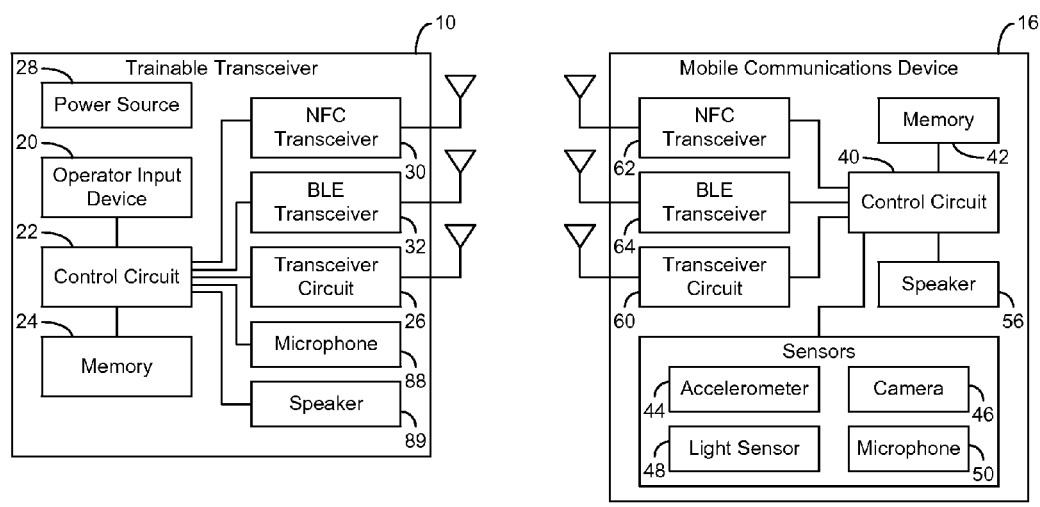
FIG. 2C illustrates a trainable transceiver and a mobile communications device including components for communication using sound waves according to an exemplary embodiment.

Referring now to FIG. 2C, the trainable transceiver 10 may include a microphone 88 and/or speaker 89 in some embodiments. The microphone 88 may be used for sensing sound. For example, the microphone 88 and/or control circuit 22 may be configured to accept voice commands form a user. This function may be supported by instructions, phoneme databases, baseform databases, programs, and/or other software and/or data stored in memory 24. Voice commands may be used in conjunction with or in place of input devices, the operator input device 20, and/or other hardware features. The functions of the trainable transceiver 10 described herein may be performed by voice commands.

In some embodiments, the speaker 89 of the trainable transceiver 10 is used to produce audio output. The speaker 89 may be used to communicate warnings, messages, and/or other information to a user. The speaker 89 may be controlled by the control circuit 22 and/or memory 24 of the trainable transceiver 10.

With continued reference to FIG. 2C, the mobile communications device 16 may include one or more microphones 50. The microphones 50 may be used for sensing the voice of a user for applications such as making telephone calls, receiving voice commands, recording voice and/or other noises, and/or other functions. The mobile communications device may further include the speaker 56 for providing audio output. The speaker 56 may be used for phone calls, playing music, and/or other audio output functions. In some embodiments, the speaker 56 may be capable of producing sound at a high volume (e.g., 65 Decibels). The speaker 56 may produce sound at a volume such that the sound may be heard at a distance from the speaker 56 (e.g., 5 meters).

In some embodiments, the mobile communications device 16 and the trainable transceiver 10 communicate using sound waves. For example, data may be encoded onto to an audio signal (e.g., sound waves from a speaker) using a control circuit configured to control the speaker. The sound wave(s) may be modulated (e.g., frequency modulation, amplitude modulation, etc.) and/or transmitted in a burst. For example, data may be communicated using a modulated ultrasound technique. The frequency, wavelength, amplitude, Decibel, and/or other parameters of the sound wave(s) may be used to communicate information in addition to or in place of modulating the sound wave output from the speaker. In some embodiments, the sound waves are in the ultrasound frequency spectrum. In other embodiments, the sound waves are in a spectrum such as the acoustic (e.g., audible) spectrum, infrasound spectrum, and/or other spectrum. In some embodiments, other techniques may be used to communicate between the mobile communications device 16 and the trainable transceiver 10 using one or more microphones and one or more speakers. In some embodiments, a fax protocol may be used for audio communication between the mobile communications device and the trainable transceiver 10.

In one embodiment, communication between the mobile communications device 16 and trainable transceiver 10 is unidirectional. For example, the mobile communications device 16 may transmit information using a sound wave source (e.g., the speaker 56) which is received by a sound sensitive sensor (e.g., the microphone 88) of the trainable transceiver 10. In other embodiments, the sound based communication between the trainable transceiver 10 and the mobile communications device 16 is unidirectional with the trainable transceiver 10 producing the sound and the mobile communications device receiving the sound.

In other embodiments, communication between the mobile communications device 16 and the trainable transceiver 10 is bi-directional. For example, the mobile communications device 16 may transmit a signal using the speaker 89 which is received by the trainable transceiver 10 using the microphone 50. The trainable transceiver 10 may transmit a signal using the speaker 56 which is received by the mobile communications devices using the microphone 88. In some embodiments, the communications protocol used coordinates transmission and reception between the mobile communications device 16 and the trainable transceiver 10 in order to facilitate bi-directional communication (e.g., the transmission includes an identifier to signal the end of a transmission and that the device is ready to receive, each device transmits using a different frequency or amplitude, each device transmits and receives at specific times, etc.).

As described above with reference to FIG. 2A, the audio communication between the mobile communications device 16 and the trainable transceiver 10 may allow for the exchange of information of a variety of types. For example, the mobile communications device 16 and the trainable transceiver 10 may communicate activation signal parameters, training information (e.g., device identification information), and/or other information related to the home electronics device 12, mobile communications device 16, and/or remote device (e.g., device status, notifications, data, etc.).

Figure 2D:
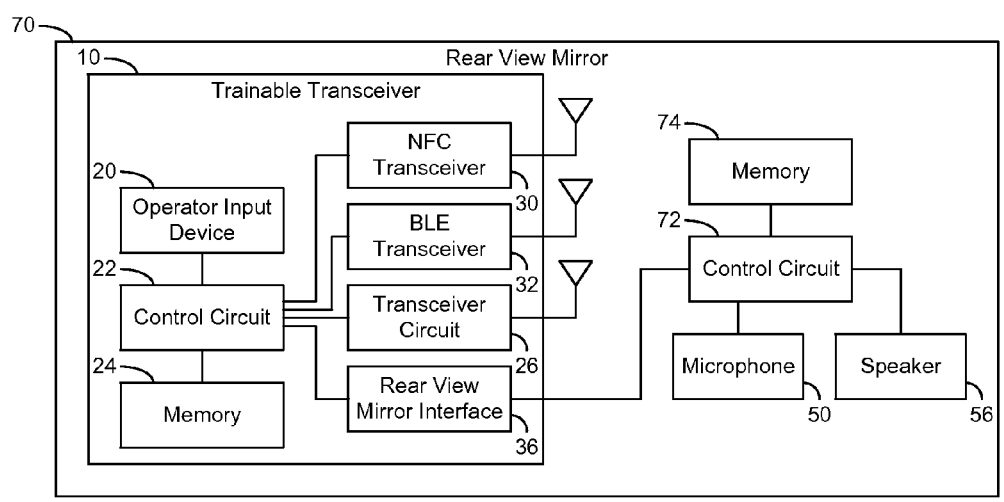
FIG. 2D illustrates a trainable transceiver integrated with a rear view mirror of a vehicle including a microphone and speaker according to an exemplary embodiment.

Referring now to FIG. 2D, the trainable transceiver 10 may be in communication with the microphone 50 and/or speaker 56 of the rear view mirror 70 of a vehicle. As explained with reference to FIG. 2B, the trainable transceiver 10 may be coupled to, integrated with, and/or otherwise be in communication with a rear view mirror 70 of the vehicle. The trainable transceiver 10 may be able to control and/or receive information from the speaker 56 and/or microphone 50 of the rear view mirror 70. For example, the trainable transceiver 10 may be in communication with the speaker 56 and/or microphone 50 of the rear view mirror 70 through one or more of the control circuit 22 of the trainable transceiver 10, rear view mirror interface 36, and control circuit 72 of the rear view mirror 70. In some embodiments, the trainable transceiver 10 uses the speaker 56 and/or microphone 50 of the rear view mirror 70 in sound wave based communications with the mobile communications device 16 using one or more techniques described above with reference to FIG. 2C. For example, the mobile communications device 16 may generate a sound wave signal using the speaker 56 of the mobile communications device 16. The speaker 56 of the rear view mirror 70 may receive the sound waves and generate an output. The trainable transceiver 10 may receive this output (e.g., through the control circuit 72 of the rear view mirror 70, rear view mirror interface 36, and/or control circuit 22 of the trainable transceiver 10). The trainable transceiver 10 may decode, interpret, and/or otherwise determine the content of the transmission. In some embodiments, the mobile communications device 16 transmits activation signal parameters, training information (e.g., device identification information), and/or other information related to the home electronics device 12, mobile communications device 16, and/or remote device (e.g., device status, notifications, data, etc.). The mobile communications device 16 may have access to this information using one of the techniques described herein.

Figure 2E:
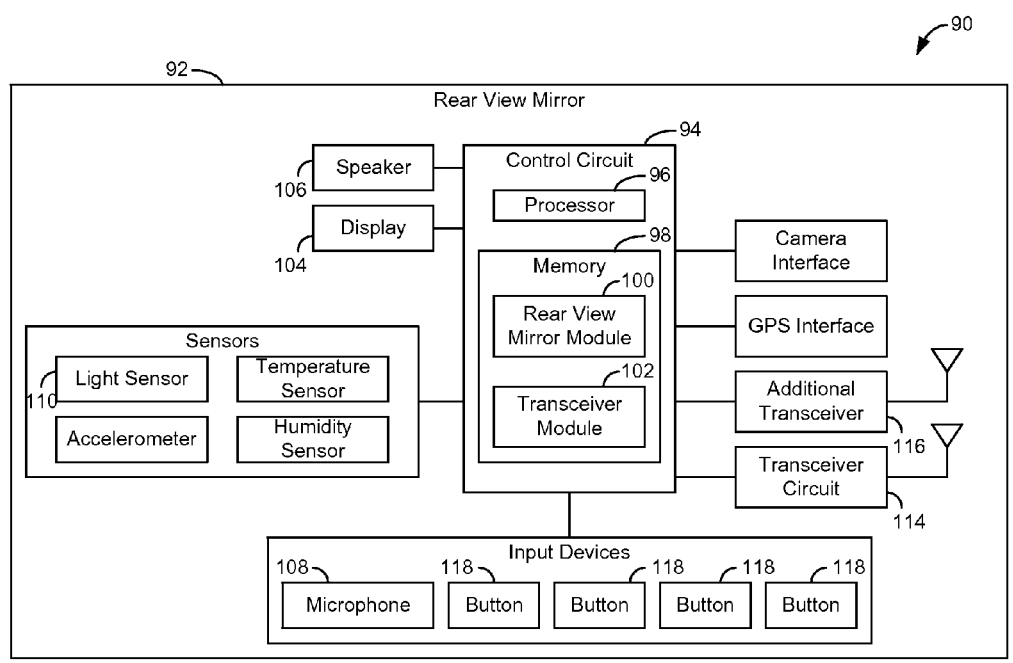
FIG. 2E illustrates an exemplary embodiment of an integrated rear view mirror and trainable transceiver system in which one or more components are shared for both trainable transceiver functions and rear view mirror functions.

Referring now to FIG. 2E, an exemplary embodiment of an integrated trainable transceiver and rear view mirror system 90 is illustrated. The unique components of the trainable transceiver 10 may be integrated with the components of the rear view mirror 70. Advantageously, this allows a rear view mirror system 90 to have the functionality of a trainable transceiver described herein and for the trainable transceiver to use components of the rear view mirror system 90 as described herein thereby avoiding duplicative components and reducing cost. In one embodiment, the components associated with the trainable transceiver 10 and the components associated with the rear view mirror 70 are located within a rear view mirror housing or housings 92. The components may be packaged together as a single rear view mirror system 90. In other embodiments, components of the integrated system 90 may be located remote from one another, in different housings, or otherwise be part of a distributed system.

In some embodiments, the functions of both the trainable transceiver and the rear view mirror may be facilitated and/or performed using a single control circuit 94. The single control circuit 94 may include a processor 96 and memory 98 which is shared by the functions of the trainable transceiver and the functions of the rear view mirror. In some embodiments, the memory 98 of the single control circuit 94 includes a rear view mirror module 100 containing database components, object code components, script components, or any other type of information structure for supporting various activities and information structures related to the functions of the rear view mirror 70. The memory 98 may include a transceiver module 102 containing database components, object code components, script components, or any other type of information structure for supporting various activities and information structures related to the functions of the trainable transceiver 10. Thus, a single control circuit 94 may support and/or carry out the functions described herein in reference to the trainable transceiver 10 and the functions of the rear view mirror 70. In some embodiment, the control circuit 94 allocates resources (e.g., processing, memory, control of other hardware components, and/or other hardware and software resources) between functions associated with the trainable transceiver 10 and functions associated with the rear view mirror 70.

The integrated trainable transceiver and rear view mirror system 90 may include some or all of the components described above with reference to FIGS. 2A-2D. For example, the integrated system 90 may include a display 104, speaker 106, microphone 108, light sensor and/or light source 110. These components may have the same functions with respect to the trainable transceiver 10 and the rear view mirror 70 as described above. In some embodiments, the integrated system 90 includes additional components such as a camera interface 112 allowing communication with one or more cameras, cameras, a transceiver circuit 114 (e.g., configured to communicate with a home electronics device and/or remote device), additional transceivers 116 (e.g., a cellular transceiver, a BLE transceiver, a NFC transceiver, and/or other transceiver), etc.).

In one embodiment, the input devices of the integrated system 90 are shared between functions related to the rear view mirror 70 and functions related to the trainable transceiver 10. For example, a single button 118 may provide input related to either the trainable transceiver 10 or the rear view mirror 70 depending on which function controls the resource. For example, a single button 118 may cause the control circuit 94 to dim the mirror when the control circuit 94 treats the button 118 as a resource related to the rear view mirror functions, and the same button 118 may cause the control circuit 94 to send an activation signal using the transceiver circuit 114 when the control circuit 94 treats the button 118 as a resource related to the trainable transceiver functions. Advantageously, this may allow the integrated system 90 to share buttons 118 or other input devices for different functions and thereby simplify the system 90 and/or reduce cost. The same sharing of hardware components may apply to input devices such as the microphone 108 and/or output devices such as the display 104 and/or speaker 106. The control circuit 94 may arbitrate inputs based on a variety of factors. For example, the control circuit 94 may take into account, inputs selecting which function the user wishes to control (e.g., a button to switch between functions), what function the previous input, output, or other action was related to, geographic proximity to a device controlled by the functions of the trainable transceiver 10, and/or other factors.

The transceiver circuit 114 may be used, as previously described, to send activation signals and/or communicate with home electronic devices, remote device, mobile communications device, network device, or other hardware. The integrated system 90 may also include one or more additional transceivers 116 as previously described. Additional transceivers 116 may allow for and/or facilitate communication between the integrated system 90 and other devices. In one embodiment, the additional transceiver 116 is or includes a cellular transceiver and/or other hardware providing the integrated system with access to the internet. Advantageously, including a transceiver circuit 114 and/or additional transceiver 116 in one or more rear view mirror housings 92 may locate the transceiver in a good location for improving reception and/or transmission of wireless signals. The rear view mirror and therefore the transceiver may be positioned high on the vehicle and be at least partially surrounded by glass. This may improve transmission and/or reception range, quality, and/or other characteristics.

Using the above described hardware, software, and/or other components, a trainable transceiver may perform a variety of functions. These functions may enhance the usability, convenience, and/or otherwise improve a trainable transceiver system from the user's perspective. The trainable transceiver may be any of the embodiments discussed above (e.g., stand alone, coupled to a rear view mirror, integrated with a rear view mirror, etc.) and/or be a combination of any of the components described herein.

Figure 2F:
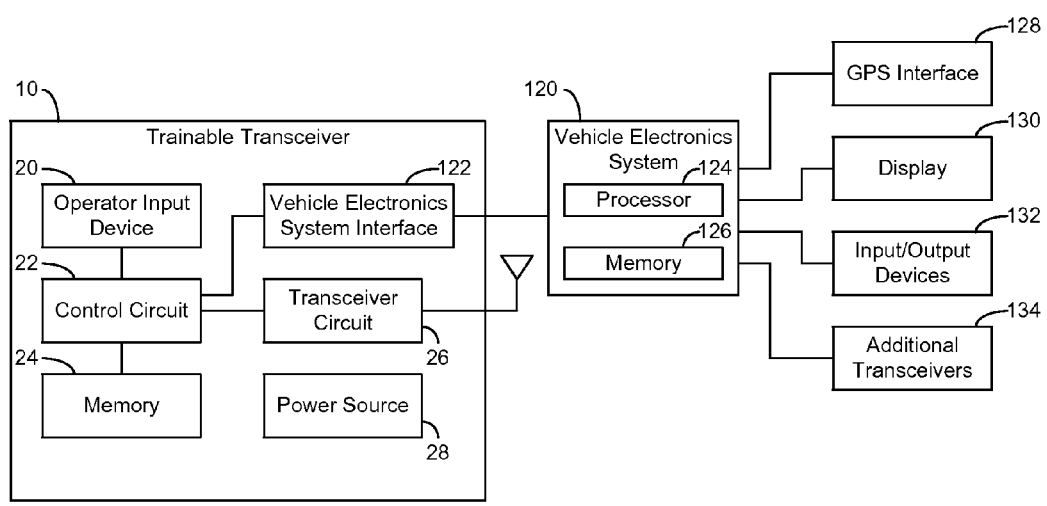
FIG. 2F illustrates an exemplary embodiment of a trainable transceiver connected to a vehicle electronics system.

Referring now to FIG. 2F, the trainable transceiver 10 is illustrated, according to an exemplary embodiment, including a connection to a vehicle electronics system 120. The connection to the vehicle electronics system 120 may be made using a vehicle electronics system interface 122 included in the trainable transceiver 10. In some embodiments, the vehicle electronics system interface 122 includes physical connection such as ports, connectors, wiring, and/or other hardware used to create an electrical connection between the control circuit 22 of the trainable transceiver 10 and the vehicle electronics system 120. In alternative embodiments, the control circuit 22 of the trainable transceiver 10 and the vehicle electronics system 120 are directly connected (e.g., wired such that outputs from one control circuit are received as inputs at the other control circuit and/or vice versa). In further embodiments, the vehicle electronics system interface 122 may include and/or be implemented by computer programming, code, instructions, or other software stored in memory 24 in the trainable transceiver 10 and/or rear view mirror. Advantageously, the connection between the trainable transceiver 10 and the vehicle electronics system 120 may allow for the trainable transceiver 10 to access, control, provide outputs to, receive inputs from, and/or otherwise communicate with components of the vehicle. The connection between the trainable transceiver 10 and the vehicle electronics system 120 may provide an advantage of allowing the trainable transceiver 10 to make use of existing vehicle hardware for use with functions of the trainable transceiver 10. Duplicative hardware may not be required thereby reducing cost and/or complexity of the trainable transceiver 10 by making use of existing hardware.

The vehicle electronics system may include processors 124 (e.g., electronic control units (ECU), engine control modules (ECM), or other vehicle processors), memory 126, buses (e.g., controller area network (CAN) bus, sensors, on-board diagnostics equipment (e.g., following the (OBD)-II standard or other protocol), cameras, displays, transceivers, infotainment systems, and/or other components integrated with a vehicle's electronics systems or otherwise networked (e.g., a controller area network of vehicle components). For example, the vehicle electronics system 120 may include, be coupled to, and/or otherwise communicate with a GPS interface 128. The GPS interface 128 may be configured to receive position information (e.g., from a GPS satellite source). Using the vehicle electronics system 120, vehicle electronics system interface 122, and/or control circuit 22, the trainable transceiver 10 may have access to position information from the GPS interface 128 (e.g., GPS coordinates corresponding to the current location of the vehicle).

Continuing the example, the vehicle electronics system 120 may include, be coupled to, and/or otherwise communicate with a display 130 of the vehicle. The display 130 may include or be a dashboard display, instrument panel display, infotainment display, rear view mirror display, rear seat display, and/or other displays in the vehicle. Using the vehicle electronics system 120, vehicle electronics system interface 122, and/or control circuit 22, the trainable transceiver 10 may have access to the display 130 of the vehicle. The trainable transceiver 10 may output images (e.g., using a frame buffer) to one or more displays 130 of the vehicle. The trainable transceiver 10 may output information related to training the trainable transceiver 10 (e.g., steps, procedures, instructions, current progress, etc.), information related to a home electronics device and/or remote device (e.g., status information, training information, identification information, etc.), diagnostic information, and/or other information accessible to the trainable transceiver 10 directly or through an intermediate device.

Continuing the example, the vehicle electronics system 120 may include, be coupled to, and/or otherwise communicate with input/output devices 132 of the vehicle. Input/output devices 132 may include hardware for receiving user input and providing output to a user. Input/output device 132 may include operator input devices, hardkey buttons, softkey buttons, touchscreens, microphones, speakers, displays, and/or other hardware. Using the vehicle electronics system 120, vehicle electronics system interface 122, and/or control circuit 22, the trainable transceiver 10 may receive inputs from and/or generate outputs using input/output devices 132 of the vehicle.

Continuing the example, the vehicle electronics system 120 may include, be coupled to, and/or otherwise communicate with additional transceivers 134 included in the vehicle. Additional transceivers may include NFC transceivers (e.g., used for pairing the mobile communications device 16 with an infotainment system), BLE transceivers (e.g., used for wireless communication between the mobile communications device 16 and an infotainment system), cellular transceivers (e.g., used for accessing the internet with the vehicle infotainment system and/or other hardware), radio transceivers (e.g., for FM radio, AM radio, high definition radio, satellite radio, etc.), and/or other transceivers. Using the vehicle electronics system 120, vehicle electronics system interface 122, and/or control circuit 22, the trainable transceiver 10 may receive information from, send information to, control, communicate, and/or otherwise interact with additional transceivers 134 of the vehicle. In some embodiments, the trainable transceiver 10 may use additional transceivers 134 of the vehicle to communicate with other devices such as home electronics devices, remote devices, and/or mobile devices. In further embodiments, the trainable transceiver 10 may use additional transceivers of the vehicle to access the internet, communicate with servers, access other networks, and/or otherwise communicate with network hardware.

Referring generally to FIGS. 2A-2F, the mobile communications device 16 and trainable transceiver 10 may communicate using quick reference (QR) codes, barcodes, and/or other machine readable images. For example, the mobile communications device 16 and/or application running thereon may generate a QR code which is displayed on a display of the mobile communications device 16. The QR code may include encoded information such as activation signal parameters, training information, pairing information, and/or other information. The QR code displayed on the mobile communications device 16 may be read using a camera, control circuit, memory, image processing algorithm, and/or other hardware or software. These components may be integrated or otherwise included in the trainable transceiver 10 and/or accessible to the trainable transceiver 10. For example, the rear view mirror 70 may include a camera (e.g., front facing camera 76, rear facing camera 78, etc.) which can be controlled by the control circuit 22 of the trainable transceiver 10 to take an image of the QR code. The control circuit 22 of the trainable transceiver 10 may receive this image and process it (e.g., decode the information contained in the QR code). For example, the control circuit 22 of the trainable transceiver 10 may decode the image and extract from the image activation signal parameters. The control circuit 22 may then use the activation signal parameters to be trained and/or configured to send activation signals to a corresponding device.

Similarly, the trainable transceiver 10 may communicate information to the mobile communications device 16 using a QR code or other machine readable image. The trainable transceiver 10 may display a QR code or other machine readable image using a display included in the trainable transceiver 10 and/or accessible to the trainable transceiver 10. For example, the trainable transceiver 10 may display or cause the QR code to be displayed on the display 80 incorporated into a rear view mirror 70 (e.g., by passing a frame buffer and/or instructions to the control circuit 72 of the rear view mirror 70). The information that the trainable transceiver 10 is communicating to the mobile communications device 16 may be encoded by the trainable transceiver 10 into the QR code. For example, the control circuit 22, memory 24, and/or other hardware or software of the trainable transceiver 10 may create a frame buffer containing the QR code. The control circuit 22 and/or other hardware or software may employ one or more algorithms to generate the frame buffer.

The mobile communications device 16 may receive the information from the trainable transceiver 10 using the camera 46 and/or control circuit 40 included in the mobile communications device 16. For example, an application running on the mobile communications device 16 may receive an image of the QR code from the camera 46 included in the mobile communications device 16. The application may then decode the information included in the machine readable image. In some embodiments, the mobile communications device 16 acquires activation signal parameters, training information (e.g., device identification information), and/or other information related to a home electronics device and/or remote device using one of the techniques described herein with reference to FIGS. 4A-7B. the mobile communications device 16 may then communicate this information and/or instructions based on this information to the trainable transceiver 10 by displaying a QR code on the display 54 of the mobile communications device 16. The trainable transceiver 10 may receive the instructions and/or information from the mobile communications device 16 by decoding the machine readable image. In response to and/or using the information and/or instructions, the trainable transceiver 10 may be configured (e.g., trained) to operate one or more home electronics devices, remote devices, and/or other devices (e.g., by formatting activation signals to control the corresponding devices).

Figure 3A:
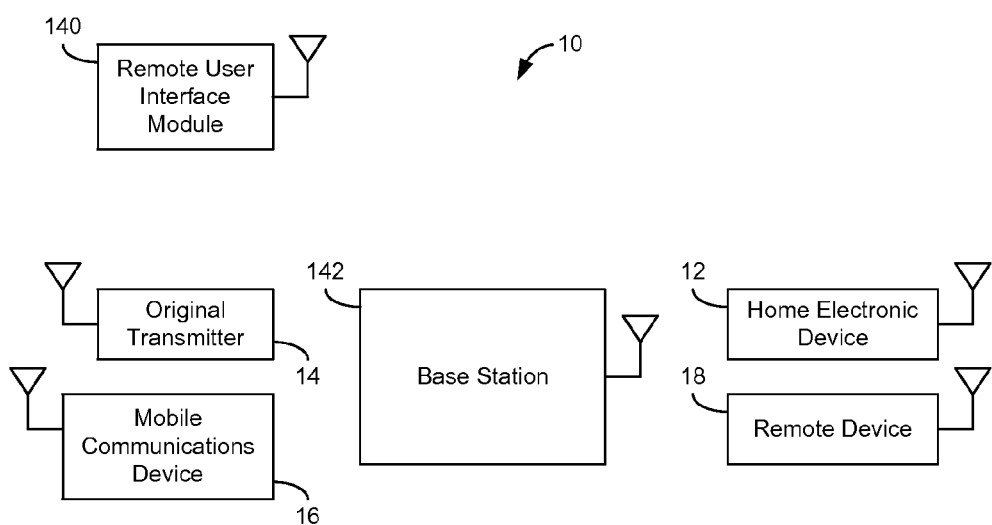
FIG. 3A illustrates an exemplary embodiment of a distributed trainable transceiver having a remote user interface module and a base station.
Figure 3B:
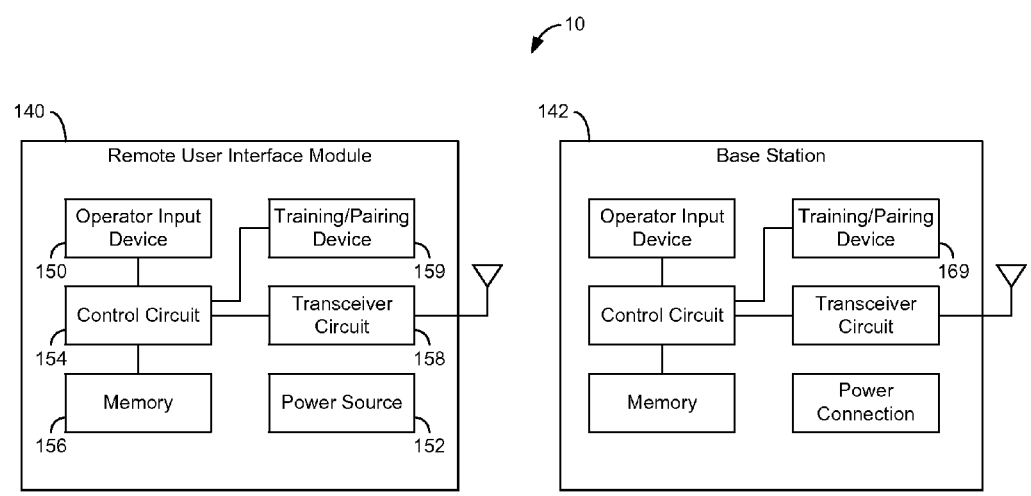
FIG. 3B illustrates the components which may be included in a remote user interface module and base station in one embodiment.

Referring now to FIGS. 3A and 3B, the trainable transceiver 10 may include two modules, a remote user interface module 140 and a base station 142. In one embodiment, the trainable transceiver 10 is a distributed system. The remote user interface module 140 may contain operator input devices 150, a power source 152, a control circuit 154, memory 156, output devices, and/or communications hardware. The remote user interface module 140 may communicate with the base station 142 located apart from the remote user interface module 140. For example, the remote user interface module 140 may include a transceiver circuit 158 used to communicate with the base station 142. The base station 142 may communicate with the remote user interface module using a transceiver circuit 168 and/or an additional transceiver such as those discussed above. The remote user interface module 140 may process user inputs and send information to the base station 142 with the transceiver circuit 158 configured to send an activation signal and/or other signal to another device. The transceiver circuit 168 in the base station 142 may be more powerful (e.g., longer range) than the transceiver circuit(s) 158 in the remote user interface module 140.

In some embodiments, the remote user interface module 140 may contain a transceiver configured to allow communication between the remote user interface module and another device such as a remote device 18 and/or mobile communications device 16. The remote user interface module 140 may serve as a communication bridge between the remote device 18 or mobile communications device 16 and another device such as the base station 142 or the home electronics device 12 or remote device in communication with the base station 142.

In other embodiments, the base station 142 may include a transceiver configured to allow communication between the remote user interface module 140 and another device such as the remote device 18 and/or mobile communications device 16. In some embodiments, the remote user interface module 140 includes a training/pairing device 159 and/or the base station 142 include a training/pairing device 169. The training/pairing devices 159 and 169 may be or include one or more transceivers (e.g., NFC transceiver, BLE transceiver, etc.), microphones, speakers, light sensors, light sources, and/or other hardware for communication between devices. The training/pairing devices 159 and 169 may allow for communication using one or more of the techniques described above with reference to FIGS. 2D-2D (e.g., BLE communication, NFC communication, light based communication, sound based communication, etc.). The training/pairing device 159 of the remote user interface module 140 may allow the remote user interface module 140 to communicate with the mobile communications device 16 and/or the base station 142. The training/pairing device 169 of the base station 142 may allow the base station 142 to communicate with the mobile communications device 16 and/or the remote user interface module 140. Communication may include pairing the mobile communications device 16 such that communications with the mobile communications device 16 are possible, pairing the remote user interface module 140 and the base station 142 such that communication between the two is possible, sending and/or receiving data, and/or other communication. In some embodiments, activation signal parameters, training information (e.g., device identification information), and/or other information related to the home electronics device 12 and/or remote device 18 are communicated between the mobile communications device 16 and the remote user interface module 140 and/or base station 142. In further embodiments, activation signal parameters, training information (e.g., device identification information), and/or other information related to the home electronics device 12 and/or remote device 18 are communicated between a remote user interface module 140 and base station 142. Communication may be unidirectional or bi-directional.

In some embodiments, the base station 142 is coupled to, connected to, and/or otherwise in communication with a system of the vehicle. For example, the base station 142 may be plugged into a power source of the vehicle such as a USB port, 12 volt power port, cigarette lighter, and/or other power source of the vehicle. In further embodiments, the base station 142 may be in communication with a vehicle electronics system. The remote user interface module 140 may be located within the vehicle remote from the base station 142. For example, the remote user interface module 140 may be coupled to a vehicle visor, rear view mirror, windshield, center counsel, and/or other vehicle component.

Referring generally to FIGS. 1-3B, the mobile communications device 16 includes an application configured to interact with the mobile communications device 16 and the trainable transceiver 10, in some embodiments. For example, the application may control a transceiver of the mobile communications device 16 for the function of communicating with the trainable transceiver 10. The application may facilitate communication between the mobile communications device 16 and the trainable transceiver 10, allow a user to configure or train the trainable transceiver 10, be used to acquire activation signal parameters stored locally (e.g., with the application in memory) and/or remotely (e.g., on a server accessible to the application using a connection to the internet provided by the mobile communications device 16), be used to transmit activation signal parameter to the trainable transceiver 10, and/or perform other functions described herein with respect to the mobile communications device 16 and/or trainable transceiver 10.

In some embodiments, the trainable transceiver 10 may access the internet using a communications connection with the mobile communications device 16. For example, the trainable transceiver 10 may transmit requests, control instructions, and/or other information to the mobile communications device causing the mobile communications device 16 to access information, send information, and/or otherwise retrieve information using an internet connection (e.g., through a cellular transceiver and/or other transceiver). The mobile communications device 16 may transmit the resulting information and/or data to the trainable transceiver 10. The mobile communications device 16 may serve as intermediary device which is used by the trainable transceiver 10 to communicate with other devices (e.g., servers, networking equipment, other mobile communications device, home electronics devices, remote devices, and/or other devices). In some embodiments, the trainable transceiver 10 may use the mobile communications device 16 to retrieve activation signal parameters, training information (e.g., device identification information), and/or other information related to the home electronics device 12 and/or remote device 18.

In some embodiments, the trainable transceiver 10 may communicate with other devices (e.g., mobile communications devices, home electronics devices, remote devices, network hardware, and/or other devices) using other techniques. These techniques may be used in addition to or in place of those previously described. For example, short message service (SMS) messages, internet communication protocols, inductive coupling, mini access point protocols (e.g., a device may be or include a mini access point that allows communication without requiring a connection to the internet, web based interfaces, and/or other communications techniques may be used.

Figure 4A:
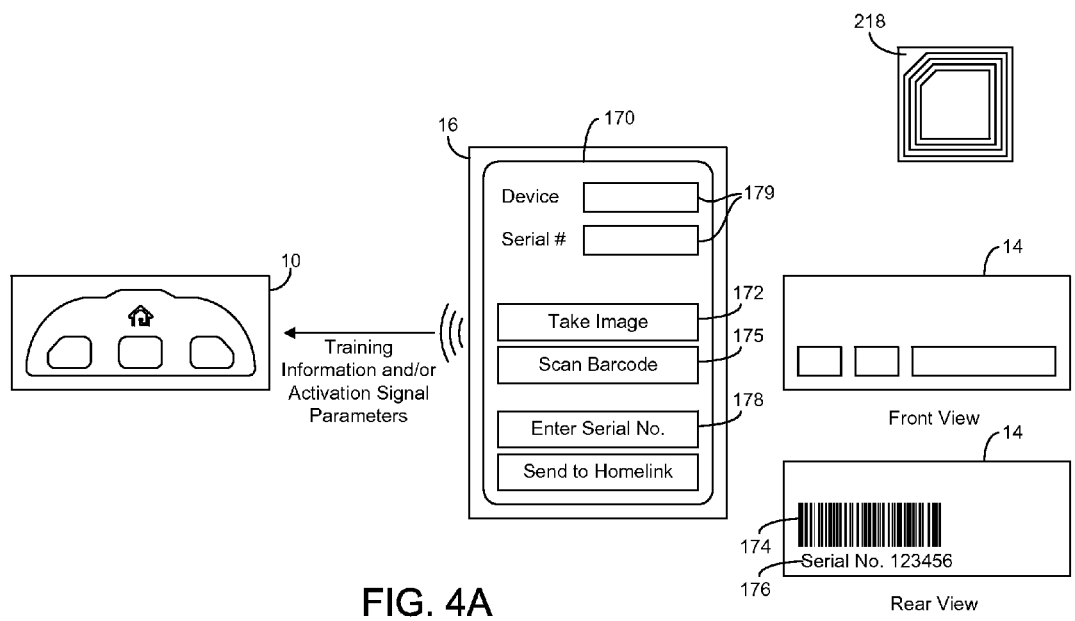
FIG. 4A illustrates a trainable transceiver in communication with a mobile communications device which may retrieve activation signal parameters and/or other information using one or more of a radio frequency identification tag, original transmitter, machine readable image, serial number, and/or other sources.
Figure 4B:
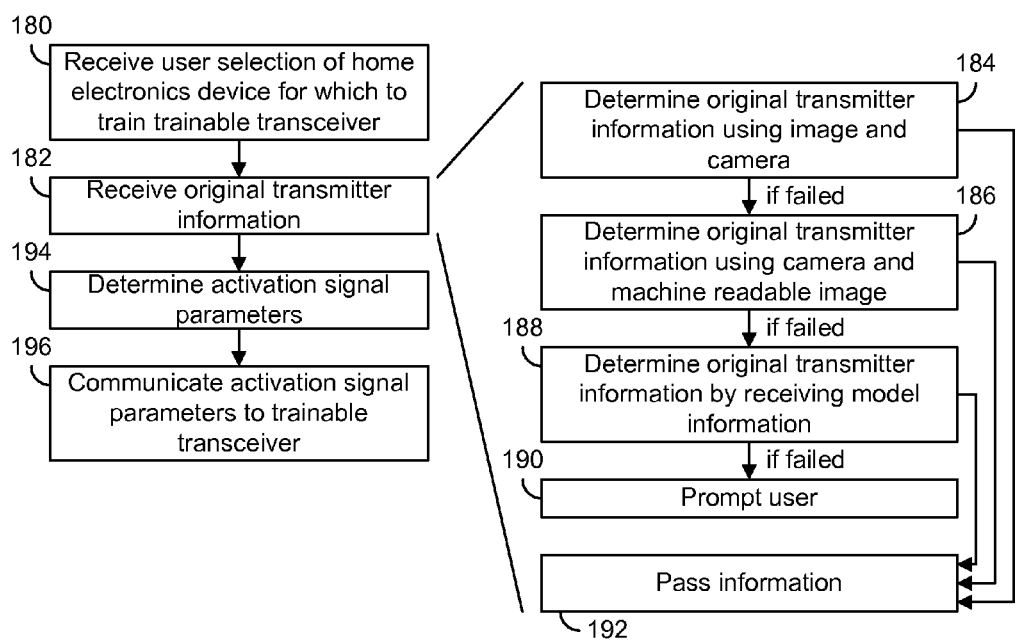
FIG. 4B illustrates a flow chart for determining activation signal parameters using a mobile communications device according to an exemplary embodiment.
Figure 4C:
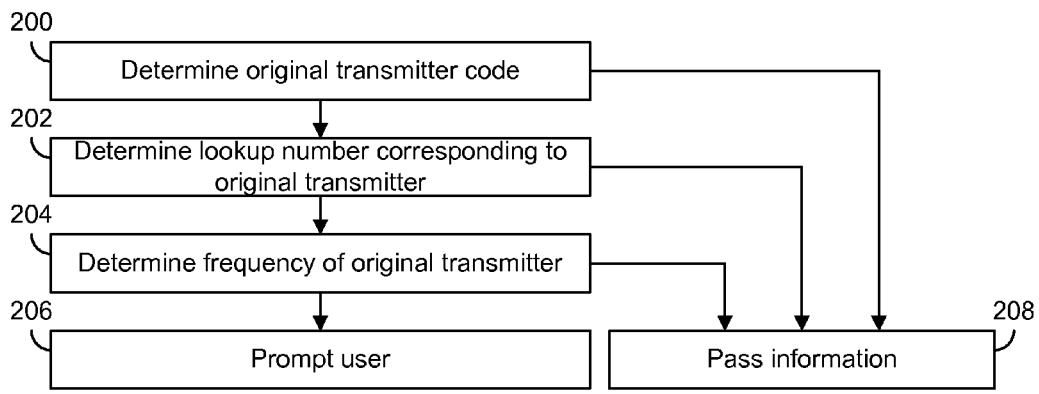
FIG. 4C illustrates a flow chart for transmitting one or more activation signal parameters determined using a mobile communications device according to an exemplary embodiment.

Referring generally to FIGS. 4A-4C, the mobile communications device 16 may be used in conjunction with the trainable transceiver 10 in order to train the trainable transceiver 10. Using the mobile communications device 16, the trainable transceiver 10 may be trained. For example, the mobile communications device 16 may access, retrieve, possess, and/or otherwise obtain activation signal parameters and/or training information (e.g., activation signal frequency, device identification information, encryption information, or other information related to controlling a device via an activation signal) corresponding to a home electronic device, remote device, and/or other device for which the trainable transceiver 10 may be trained to control or otherwise communicate with.

In some embodiments, the mobile communications device 16 transmits this information to the trainable transceiver 10 using one or more of the techniques described above with reference to FIGS. 2A-3B. The trainable transceiver 10 may then configure itself such that the trainable transceiver 10 is configured to control the home electronic device 12 and/or remote device 18 associated with the transmission received from the mobile communications device 16. For example, the trainable transceiver 10 may receive the transmission using a transceiver (e.g., BLE transceiver). A control circuit coupled to the transceiver and/or memory may then interpret, analyze, process, and/or otherwise manipulate the information received in the transmission. For example, the control circuit may store in memory (e.g., in a database) a device identifier and corresponding activation signal parameters received from the mobile communications device. As a result of storing this information, the trainable transceiver 10 may be trained to control the device. In other words, the trainable transceiver 10 may access the activation signal parameters for a particular device based on identification information of the device. The activation signal parameters may be used to format an activation signal which is then sent to the device (e.g., via a transceiver circuit coupled to the control circuit). In some embodiments, the training process may include additional steps such as assigning an operator input device component (e.g., one or three buttons) to correspond to the device identifier and/or activation signal parameters for the particular device. This assignment may be stored in memory.

In other embodiments, the trainable transceiver 10 is configured by the transmission received from the mobile communications device. For example, the transmission from the mobile communications device may include instructions which are executed by the control circuit, memory, a program, and/or other hardware or software of the trainable transceiver 10. These instructions may include information such as which button the particular device is assigned to, the activation signal parameters corresponding to the device, a device identifier, and/or other information. The instructions may also include computer code, computer instructions, and/or other executable data which causes the trainable transceiver 10 (e.g., through the control circuit) to take a particular action. For example, the instructions may cause the control circuit of the trainable transceiver 10 to takes actions such as storing information (e.g., activation signal parameters, device identification information, operator input device assignments, and/or other information) to particular places in memory of the trainable transceiver 10. Thus, the trainable transceiver 10 may be configured by instructions received from the mobile communications device 16. In some embodiments, additional steps may be included in the training process. For example, user input may be provided to train the trainable transceiver 10 in whole or in part. In other words, the transmission from the mobile communications device may cause the trainable transceiver 10 to configure itself for sending activation signals to a particular device, but user input may be used to take further actions such as assigning the device to a particular button or other input mechanism (e.g., assigning a voice command to the device), completing the training process, sending a test signal, confirming the device as the device for which the trainable transceiver 10 is to be trained to control, and/or other actions.

Referring now to FIG. 4A, the mobile communications device 16 running an application for determining activation signal parameters, training information (e.g., activation signal frequency, device identification information, encryption information, or other information related to controlling a device via an activation signal), and/or other information corresponding to a home electronic device, remote device, and/or other device is illustrated according to an exemplary embodiment. In some embodiments, the mobile communications device 16 may retrieve, determine, access, and/or otherwise obtain signal parameters, training information, and/or other information corresponding to the home electronic device 12, remote device 18, and/or other device from the original transmitter 14 associated with the device. In one embodiment, the mobile communications device 16 runs an application 170, program, and/or other computer code or instructions for identifying information from an original transmitter. The application 170 may be downloaded from an application store associated with an operating system running on the mobile communications device 16, transferred to the mobile communications device 16 from a computer, be preloaded onto the mobile communications device 16 by a manufacturer, be transferred to the mobile communications device 16 by a vehicle electronic system in communication with the mobile communications device 16 (e.g., a vehicle infotainment system), and/or otherwise come to reside on the mobile communications device 16 (e.g., be stored in memory). The application 170 and the functions described herein may be carried out by a control circuit, software, and/or other hardware of the mobile communications device 16.

In one embodiment, the application 170 and/or mobile communications device 16 are configured to determine activation signal parameters, training information, and/or other information corresponding to a device based on an image of the original transmitter 14 corresponding to the device. Using the camera 46 included in the mobile communications device 16, an image of the original transmitter 14 may be acquired. For example, the application 170 includes a button 172 which when pressed causes the application 170 to control the camera 46 of the mobile communications device 16 and take a picture of the original transmitter 14. Using image processing techniques and/or algorithms (e.g., object/image recognition algorithms, object detection algorithms, machine vision algorithms, and/or other image processing techniques), an image of the original transmitter 14 may be analyzed to determine the make, model, serial, number, and/or other information pertaining to the original transmitter 14 and/or the device with which the original transmitter 14 is associated. In some embodiments, the mobile communications device 16 may perform image processing techniques. In other embodiments, the mobile communications device 16 may transmit the image(s) to another source for processing. For example, the mobile communications device 16 may transmit the images to a server which processes the images. Continuing the example, the image may be transmitted to the trainable transceiver 10, vehicle electronics system, and/or other source for analysis.

In some embodiments, the make, model, serial, number, and/or other information pertaining to the original transmitter 14 and/or the device with which the original transmitter 14 is associated are determined by comparing the sensed image (e.g., image from the camera 46 of the mobile communications device 16) with an image stored in a database (e.g., comparison image(s)). If the two images match with a certain degree of certainty or above a certain threshold, it may be determined that the original transmitter 14 imaged by the mobile communications device 16 corresponds with the image in the database. In other embodiments, the make, model, serial, number, and/or other information pertaining to the original transmitter 14 and/or the device with which the original transmitter 14 is associated are determined by analyzing the image and determining a model number, serial number, make, or other information based on text and/or numbers found in the image(s). For example, text recognition algorithms may be applied to the image in order to identify information found in the image. In further embodiments, a user may enter one or more pieces of information for use along with or in place of the above described techniques for determining information related to the original transmitter 14 and/or associated device. For example, a user may input to the application a make of the device to be used in determining information about the particular device. Advantageously, user input may reduce processing time, increase accuracy, and/or otherwise improve one or more of the above described techniques by narrowing the number of images against which the sensed image is compared, and/or providing additional known information to the algorithm(s) used.

The database containing the comparison images, model number, serial number, make, an/or other information to which a comparison is made with data (e.g., images) from the mobile communications device 16 may include entries corresponding to each device containing information relevant to training the trainable transceiver 10. For example, the database used for comparison purposes may include activation signal parameters, training information (e.g., activation signal frequency, device identification information, encryption information, or other information related to controlling a device via an activation signal), and/or other information corresponding to each stored device. In one embodiment, the database is stored locally on the mobile communications device 16 (e.g., transferred to the mobile communications device 16 as part of the application 170 and stored in memory). In other embodiments, the database is stored remotely. For example, the database may be stored on a server, trainable transceiver 10, vehicle electronics system, and/or in other remote locations. The database may be stored, in its entirety or in parts, on one or more remote sources. The database may be stored as separate components in different locations. For example, the comparison information (e.g., images and/or serial numbers) may be stored in one location (e.g., on a server) with the activation signal parameters, training information, and/or other information stored in a spate location (e.g., on the mobile communications device 16).

The mobile communications device 16 may retrieve, be sent, lookup, and/or otherwise gain access to activation signal parameters, training information, and/or other information from the database corresponding to identification information (e.g., images, serial numbers, etc.). For example, the mobile communications device 16 may receive this information from a server in response to uploading an image of the original transmitter 14 to the server. In other embodiments, this information may be looked up by the mobile communications device 16 in a locally stored database in response to a device serial number, make, model, and/or other identifier received from a server which in turn received an image from the mobile communications device 16. Other combinations of the above described techniques are possible, and alternative, additional, and/or other combinations of one or more of the above described techniques may be used such that the mobile communications device 16 has access to activation signal parameters, training information, and/or other information related to a home electronics device, remote device, and/or other device.

Upon receiving activation signal parameters, training information, and/or other information related to a home electronics device, remote device, and/or other device, the mobile communications device 16 (e.g., via the application 170) may send the information to the trainable transceiver 10 using one or more of the techniques described above with reference to FIGS. 2A-3B (e.g., communication using one or more BLE transceivers). The trainable transceiver 10 may in turn be trained using this information and one or more of the techniques previously described (e.g., the trainable transceiver 10 may receive executable instructions from the mobile communications device 16 which train the trainable transceiver 10).

In one embodiment, the above described analysis is performed locally using hardware and/or software of the mobile communications device 16. In other embodiments, all or part of the above described analysis is performed remotely at one or more locations. For example, the analysis may be performed remotely by a server, vehicle electronics system, trainable transceiver 10, and/or by other hardware/software in communication with the mobile communications device 16. Part of the analysis may be performed locally with another part performed remotely. For example, image processing algorithms may be applied remotely and a device identifier returned to the mobile communications device 16. The mobile communications device 16 may then search a database of device identifiers to find a match and read/retrieve corresponding information stored in the database such as determine activation signal parameters, training information, and/or other information corresponding to a device.

Still referring to FIG. 4A, in one embodiment, the application 170 and/or mobile communications device 16 are configured to determine activation signal parameters, training information, and/or other information corresponding to a device based on a machine readable image 174 found on the original transmitter 14 which may correspond to the device. For example, the original transmitter 14 may include a barcode, quick reference (QR) code, and/or other machine readable image. The machine readable image 174 may have encoded information such as the make, model, serial number, identification information, and/or other information related to the original transmitter 14 and/or the corresponding home electronic device, remote device, and/or other device. In some embodiments, the machine readable image 174 may have encoded information such as activation signal parameters, training information, and/or other information.

In some embodiments, the application 170 and/or mobile communications device 16 is configured to scan the machine readable image 174. For example, the application 170 may include a button 175 which, when pressed by a user, causes the camera 46 of the mobile communications device 16 to be activated. One or more images of the machine readable image 174 may be captured. The images may be analyzed using techniques for processing machine readable images. In some embodiments, these techniques may include image processing algorithms, machine vision algorithms, and/or other techniques for processing machine readable images.

As explained above with reference to FIG. 4A, the analysis of image(s) of the machine readable image may be conducted locally (e.g., by the mobile communications device 16), remotely (e.g., by a server, trainable transceiver 10, etc.), and/or in a combination of local and remote analysis. One or more of the techniques, configurations, functions, parameters, etc. as described above with reference to an image of the original transmitter 14 may be applied in whole or in part to the machine readable image 174. Similarly, upon determining identification information related to the original transmitter 14 and/or associated device, information (e.g., activation signal parameters, training information, and/or other information corresponding to a device) may be looked up in database. This may be done in the same or in a similar manner to that discussed above with reference to training the trainable transceiver 10 using an image of the original transmitter 14. Upon receiving activation signal parameters, training information, and/or other information related to a home electronics device, remote device, and/or other device, the mobile communications device 16 (e.g., via the application 170) may send the information to the trainable transceiver 10 using one or more of the techniques described above with reference to FIGS. 2A-3B (e.g., communication using one or more BLE transceivers). The trainable transceiver 10 may in turn be trained using this information and one or more of the techniques previously described (e.g., the trainable transceiver 10 may receive executable instructions from the mobile communications device 16 which train the trainable transceiver 10). In other words, the above described techniques may be performed with information related to the make, model, serial, number, and/or other information pertaining to the original transmitter 14 and/or the device with which the original transmitter 14 is associated determined using a machine readable image 174 rather than from an image of the original transmitter 14.

For example, the mobile communications device 16 may capture the machine readable image 174. The mobile communications device 16 may process the machine readable image 174 and determine information about the original transmitter 14. This information may be make, model, serial number, identification information, activation signal parameters, training information, and/or other information. The mobile communications device 16 may use this information to look up activation signal parameters, training information, and/or other information in a database (local or remote) and/or send activation signal parameters, training information, and/or other information to the trainable transceiver 10. In some embodiments, one or more of these steps may be performed wholly or in part remotely.

Still referring to FIG. 4A, in one embodiment, the application 170 and/or mobile communications device 16 are configured to determine activation signal parameters, training information, and/or other information corresponding to a device based on information related to the original transmitter 14 corresponding to the device which is entered manually by a user in the application. For example, the original transmitter 14 may include printed information 176 such as make, model, serial number, identification information, and/or other information related to the original transmitter 14 and/or the corresponding home electronic device, remote device, and/or other device. The information 176 may be printed on or otherwise labeled on the original transmitter 14, an instruction manual, and/or other source. In some embodiments, the original transmitter 14 and/or other source may include other information such as activation signal parameters, training information, device codes, device identification information, etc.

In some embodiments, the application 170 and/or mobile communications device 16 is configured to prompt, allow, and/or otherwise receive user input of information. For example, the application 170 may include a button 178 which, when pressed by a user, brings up a field or fields 179 in which the user may enter information about the original transmitter and/or associated device. This information may be analyzed to determine activation signal parameters, training information, and/or other information corresponding to a device.

As explained above with reference to FIG. 4A, the analysis of the information may be conducted locally (e.g., by the mobile communications device 16), remotely (e.g., by a server, trainable transceiver 10, etc.), and/or in a combination of local and remote analysis. One or more of the techniques, configurations, functions, parameters, etc. as described above with reference to an image of the original transmitter 14 may be applied in whole or in part to information input by a user. Similarly, upon determining identification information related to the original transmitter 14 and/or associated device, information (e.g., activation signal parameters, training information, and/or other information corresponding to a device) may be looked up in database. This may be done in the same or in a similar manner to that discussed above with reference to training the trainable transceiver 10 using an image of the original transmitter 14. Upon receiving activation signal parameters, training information, and/or other information related to a home electronics device, remote device, and/or other device, the mobile communications device 16 (e.g., via the application 170) may send the information to the trainable transceiver 10 using one or more of the techniques described above with reference to FIGS. 2A-3B (e.g., communication using one or more BLE transceivers). The trainable transceiver 10 may in turn be trained using this information and one or more of the techniques previously described (e.g., the trainable transceiver 10 may receive executable instructions from the mobile communications device 16 which train the trainable transceiver 10). In other words, the above described techniques may be performed with information related to the make, model, serial, number, and/or other information pertaining to the original transmitter 14 and/or the device with which the original transmitter 14 is associated determined using information input by a user rather than from an image of the original transmitter 14.

For example, a user may enter a serial number, make, model, and/or other information into the application 170 (e.g., using a touchscreen keyboard). The mobile communications device 16 may process user provided information and determine information about the original transmitter 14. This information may be make, model, serial number, identification information, activation signal parameters, training information, and/or other information. The mobile communications device 16 may use this information to look up activation signal parameters, training information, and/or other information in a database (local or remote) and/or send activation signal parameters, training information, and/or other information to the trainable transceiver 10. In some embodiments, one or more of these steps may be performed wholly or in part remotely.

In some embodiments, one or more of the above described techniques (e.g., use of image recognition techniques, use of machine readable images techniques, and/or use of user inputs) may be used in conjunction with a home electronics device, remote device, and/or other device rather than with the original transmitter 14. For example, the mobile communications device 16 may use the camera 46 to capture an image(s) of a home electronics device, read a machine readable image of a remote device, receive user input regarding a home electronics device, etc.

In some embodiments, a combination of one or more of the above described techniques for training the trainable transceiver 10 (e.g., based on an image, based on a machine readable image, and/or based on user input) may be used to train the trainable transceiver 10. For example, the application 170 on the mobile communications device 16 may determine activation signal parameters, training information, and/or other information corresponding to a device based on analyzed image of the original transmitter 14, information obtained from the machine readable image 174, and/or information input by a user.

Referring now to FIG. 4B, a flow chart illustrates a method of determining control signal parameters, training information, and/or other information corresponding to the home electronic device 12, remote device 18, and/or other device using the mobile communications device 16 according to an exemplary embodiment. The mobile communications device 16 (e.g., the application 170 running on the mobile communications device 16) may receive a user input corresponding to a user selection of the home electronics device 12, remote device, 18 and/or other device for which to train the trainable transceiver 10 (step 180). For example, a user may select from a drop down menu, input using a field, or otherwise provide the mobile communications device 16 or application 170 with a selection of a type of device (e.g., garage door opener, motorized gate, security system, lighting system, etc.), make of device, model of device, and/or other information. This information may be used in conjunction with one or more of the techniques described above in order to train the trainable transceiver 10 to control the device. In some embodiments, this step is omitted. This step may not be required with other steps providing information for training the trainable transceiver 10.

The application may receive original transmitter information (step 182). This may be carried out using one or more of the techniques previously described. For example, retrieving original transmitter information may include a plurality of steps. In one embodiment, the application may prompt a user to take an image(s) of the original transmitter 14 corresponding to the device for which the trainable transceiver 10 is being trained to operate. The application and/or other hardware and software may determine original transmitter information using the image captured by the camera 46 and one or more of the techniques described above (step 184). For example, the mobile communications device 16 and/or application 170 may apply image processing algorithms to the image to determine information such as make, model, serial number, etc. Images(s) of the original transmitter 14 may be compared to other images in a database containing original transmitter information (e.g., make model, serial number, identification information, training information, activation signal parameters, etc.) along with the comparison information. The information may be retrieved from the database (e.g., locally and/or remotely). The application 170 may pass original transmitter information determined in this step to the next step of the process.

If the application fails to determine original transmitter information using an image of the original transmitter 14, the application 170 may prompt the user to scan a barcode or other machine readable image 174 associated with the original transmitter 14. The application 170 may determine original transmitter information using the camera 46 associated with the mobile communications device 16 and the machine readable image 174 (step 186). For example, the application 170 may apply an algorithm to an image of the machine readable image 174 provided by the camera 46 of the mobile communications device 16. The algorithm may decode information encoded in the machine readable image 174. Encoded information may include information such as make, model, serial number, activation signal parameters, training information, and/or other information related to the original transmitter 14 and/or associated device. In embodiments where the encoded information includes activation signal parameters and/or training information, the application 170 may skip additional steps and proceed to communicating activation signal parameters to the trainable transceiver 10 (e.g., using one or more of the techniques previously described). In alternative embodiments, the application 170 may pass original transmitter information determined in this step to the next step of the process.

If the application fails to determine original transmitter information using a machine readable image of the original transmitter 14, the application 170 may prompt the user to manually enter information about the original transmitter 14 and/or associated device. In some embodiments, the application 170 may use all or some of the information entered in the first step (e.g., receiving a user selection of the device for which to train the trainable transceiver 10) in conjunction with or in place of information manually entered in the current step. In some embodiments, the application 170 determines original transmitter information by receiving model information from the user (step 188). The information received from the user may be entered into the application using drop down menus listing devices, buttons, fields, and/or other user interface features. For example, a user may search for a device by entering search terms into a field. The information provided by the user may be used to determine original transmitter information by comparing information from the user to information stored in a database which is stored along with corresponding original transmitter information. The application 170 may pass original transmitter information determined in this step to the next step of the process.

In some embodiments, if the above described techniques to determine original transmitter information fail, the user receives a prompt (step 190). The prompt may provide the user with alternative instructions on training the trainable transceiver 10, customer support information, diagnostic information, and/or otherwise provide information to the user (step 192).

In some embodiments, the step of receiving original transmitter information includes only one of the above described steps/techniques. Receiving original transmitter information may include the mobile communications device 16 receiving original transmitter information from a local source (e.g., a database stored in local memory) and/or a remote source. For example, the remote source may be a server which processes information provided by the mobile communications device 16 (e.g., runs image processing algorithms, decodes machine readable images, etc.) and/or includes a database. Similarly, one or more of the techniques described (e.g., using an image of the original transmitter 14, using the machine readable image 174, and using user input) may include local and/or remote components. For example, data may be acquired locally (e.g., images captured) with the data processed remotely (e.g., the images are transmitted to a server which analyzes them and acquires original transmitter information which is sent back to the mobile communications device 16).

Upon receiving original transmitter information, the original transmitter information may be passed along such that the mobile communications device 16 and/or other device may determine activation signal parameters (step 194). As described above with reference to FIG. 4A, activation signal parameters may be determined using a database containing device identification information and activation signal parameters. The known identification information (e.g., original transmitter information) may be compared to the database and activation signal parameters may be retrieved corresponding to the identification information. In some embodiments, the activation signal parameters may be determined using a different and/or additional technique. For example, activation signal parameters may be encoded in the machine readable image 174 found on the original transmitter 14. The activation signal parameters may be determined by the application 170 by decoding the machine readable image 174. Also as described above with reference to FIG. 4A, one or more steps, functions, or aspects of the techniques for determining activation signal parameters may be performed entirely or in part on hardware remote from the mobile communications device 16 (e.g., a server in communication with the mobile communications device 16). For example, a server may determine activation signal parameters by comparing information received from the mobile communications device 16 to information stored in a database also containing activation signal parameters. The server may determine the corresponding activation signal parameters and transmit them to the mobile communications device 16.

Upon determining, receiving, accessing, and/or otherwise obtaining activation signal parameters, the mobile communications device 16 may communicate activation signal parameters and/or other information to the trainable transceiver 10 (step 196). The mobile communications device 16 may communicate with the trainable transceiver 10 using one or more of the techniques described above with respect to FIGS. 2A-3B and/or other communications techniques. For example, the mobile communications device 16 and/or application 170 may communicate activation signal parameters to the trainable transceiver 10 using a BLE transceiver included in the mobile communications device 16. The application 170 may provide instructions and/or otherwise control hardware and/or software of the mobile communications device 16 such that the application 170 causes a transmission using a BLE transceiver and/or other transceiver included in the mobile communications device 16. The transmission may include activation signal parameters and/or other information. The trainable transceiver 10 may receive the transmission using a BLE transceiver and/or other transceiver included in the trainable transceiver 10 and/or otherwise accessible to the trainable transceiver 10.

Continuing the example, the mobile communications device 16 and/or application 170 may communicate activation signal parameters to the trainable transceiver 10 using light in some embodiments. The application 170 may generate instructions and/or otherwise control hardware of the mobile communications device 16 such as the screen and/or a flash to generate a light based signal transmitting the activation signal parameters. The light based transmission may be received by a light sensor and/or camera included in the trainable transceiver 10 and/or otherwise accessible to the trainable transceiver 10.

Continuing the example, the mobile communications device 16 and/or application 170 may communicate activation signal parameters to the trainable transceiver 10 using sound in some embodiments. For example, the application 170 and/or mobile communications device 16 may generate an instruction for controlling a speaker and/or otherwise control a speaker of the mobile communications device 16. The application may generate a sound based transmission including activation signal parameters and/or other information which is transmitted by a speaker of the mobile communications device 16 and/or a speaker controlled by the mobile communications device 16. The sound transmission may be received by a microphone included in the trainable transceiver 10 and/or otherwise accessible to the trainable transceiver 10.

The trainable transceiver 10 may use the activation signal parameter received from the mobile communications device 16 to train itself for operation with the corresponding device. In other embodiments, the transmission received from the mobile communications device 16 is or includes instructions which, when executed by the trainable transceiver 10, cause the trainable transceiver 10 to be configured to operate with the associated device. In some embodiments, the mobile communications device 16 does not transmit or communicate activation signal parameters directly to the trainable transceiver 10. One or more intermediary devices may be used to provide the information to the trainable transceiver 10. For example, the activation signal parameters may be transmitted from a server in communication with the mobile communications device 16 to the trainable transceiver 10. The trainable transceiver 10 may access the server through an internet connection (e.g., using a cellular transceiver of a vehicle which is in communication with the trainable transceiver 10).

Referring now to FIG. 4C, a flow chart illustrates a method of determining what control signal parameters, training information, and/or other information corresponding to a home electronic device, remote device, and/or other device to transmit to the trainable transceiver 10 using the mobile communications device 16 according to an exemplary embodiment. In some embodiments, the techniques previously described for determining activation signal parameters corresponding to the original transmitter 14 and/or associated device result in less than all activation signal parameters being determined for a device. In such a case, the mobile communications device 16 may transmit varying amounts and/or degrees of information to the trainable transceiver 10 related to signal parameters, training information, and/or other information.

The mobile communications device 16 and/or application 170 may determine one or more codes (e.g., encryption information including a rolling code, rolling code seed, look-a-head codes, secret key, fixed code, or other information related to an encryption technique) (step 200). The mobile communications device 16, application, and/or additional hardware and/or software (e.g., a server running image processing algorithms) may determine one or more codes using one or more of the techniques previously described (e.g., using an image of the original transmitter 14, using the machine readable image 174 associated with the original transmitter 14, and/or using user input). If one or more codes corresponding to the activation signal generated by the original transmitter 14 are successfully determined, the one or more codes may be passed along for transmission. For example, the code(s) may be transmitted to the trainable transceiver 10 and/or other devices. The code(s) may be transmitted along with other information (e.g., frequencies, channels, device identification information, etc.).

If the application 170, mobile communications device 16, and/or other hardware/software are unable to determine a code corresponding to the original transmitter 14, the application and/or mobile communications device may determine a lookup number corresponding to the original transmitter 14 (step 202). If a lookup number corresponding to the original transmitter 14 is successfully determined, the lookup number may be passed to an additional step and/or other hardware (e.g., a server, trainable transceiver 10, etc.). For example, the lookup number may be transmitted to the trainable transceiver 10 and/or other devices. The lookup number may be transmitted along with other information (e.g., frequencies, channels, device identification information, etc.). The device receiving the lookup number (e.g., the trainable transceiver 10) may use the lookup number to query a database and retrieve corresponding activation signal parameters signal parameters, training information, and/or other information corresponding to a home electronic device, remote device, and/or other device. Alternatively, the mobile communications device 16 may use the lookup number to locally determine activation signal parameters signal parameters, training information, and/or other information corresponding to a home electronic device, remote device, and/or other device. This information may then be transmitted to the trainable transceiver 10 and/or another device.

If the application 170, mobile communications device 16, and/or other hardware/software are unable to determine lookup number corresponding to the original transmitter, the application and/or mobile communications device may determine a frequency or frequencies used by the original transmitter 14 (step 204). This information may be passed to the trainable transceiver 10, server, and/or other device. The information may be used by the application 170 and/or mobile communications device 16. If no information can be determined about the original transmitter 14, the user may be prompted by the application 170 (step 306). For example, the prompt may direct the user to contact customer support, try an alternative training technique, etc.

Still referring to FIG. 4C, the illustrated hierarchy for determining and passing information (e.g., more specific information to least specific information) may be used to distribute tasks among the mobile communications device 16 and remote devices (e.g., servers, the trainable transceiver 10, etc.). Advantageously, this may allow the application 170 to require less memory of the mobile communications device 16 and/or less computing time, performance, or other resources. For example, a smaller database may be stored on the mobile communications device 16 than in the case where the mobile communications device 16 performs all tasks locally.

In some embodiments, the mobile communications device 16 includes locally stored database information which may include activation signal parameters signal parameters, training information, and/or other information corresponding to a home electronic device, remote device, and/or other device. Using one or more of the techniques previously described (e.g., using an image of the original transmitter 14, using the machine readable image 174 associated with the original transmitter 14, and/or using user input) the mobile communications device 16 may attempt to determine activation signal parameters, such as one or more original transmitter codes, in conjunction with the locally stored database. The locally stored database may be a subset of devices such as the most commonly sold devices for which the trainable transceiver 10 may be trained to operate. If a code is identified it may be passed to a further step conducted by the application, passed to a server, passed to the trainable transceiver 10, and/or otherwise communicated to hardware and/or software (step 208).

If the mobile communications device 16 and/or application 170 fails to identify an original transmitter code using the locally stored database, the mobile communications device 16 and/or application 170 may determine a lookup number corresponding to the original transmitter 14. The lookup number may be and/or be related to a model number, make number, serial number, and/or other identifying characteristic of the original transmitter 14 and/or associated device. In some embodiments, a lookup number is determined by consulting a locally stored database of identifying characteristics and associated lookup numbers. Upon determining a lookup number, the mobile communications device 16 may pass the lookup number (e.g., to another step, other hardware, and/or other software). For example, the mobile communications device 16 may transmit the lookup number to a server, trainable transceiver 10, and/or other device. The server, trainable transceiver 10, and/or other device may use the lookup number and/or a database of lookup numbers and associated activation signal parameters signal parameters, training information, and/or other information corresponding to a home electronic device, remote device, and/or other device to retrieve information corresponding to the lookup number. This corresponding information may include activation signal parameters signal parameters, training information, and/or other information corresponding to a home electronic device, remote device, and/or other device. Advantageously, the remote database may be larger and/or more comprehensive than a database stored locally on the mobile communications device 16 thereby reducing the amount of mobile communications device memory used. The mobile communications device 16 may receive activation signal parameters signal parameters, training information, and/or other information corresponding to a home electronic device, remote device, and/or other device from a remote source which has identified this information using the lookup number. The mobile communications device 16 may pass this information to the trainable transceiver 10 using one or more of the techniques described herein.

If the mobile communications device 16 and/or application 170 fails to determine a lookup number corresponding to an original transmitter 14 locally, the mobile communications device 16 and/or application 170 may determine a frequency and/or frequencies (e.g., channels) used by the original transmitter 14. If a frequency and/or frequencies used by the original transmitter 14 are determined, the mobile communications device 16 may pass this information to the trainable transceiver 10, server, and/or other device using one or more of the techniques described herein. If no information can be determined about the original transmitter 14, the user may be prompted by the application 700. For example, the prompt may direct the user to contact customer support, try an alternative training technique, etc.

Figure 4D:
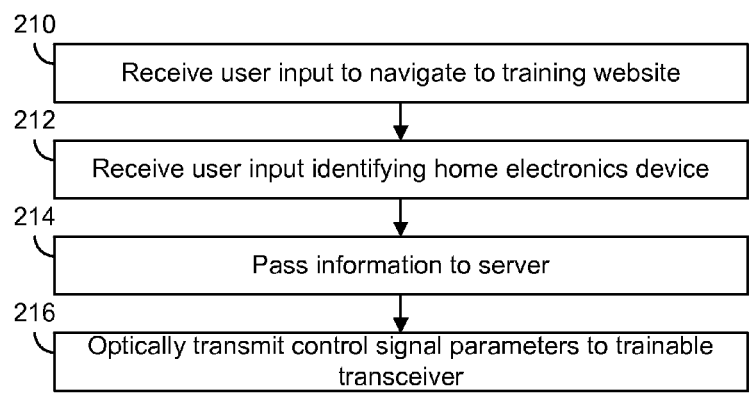
FIG. 4D illustrates a flow chart for determining one or more activation signal parameters or other information using a mobile communications device and a server according to an exemplary embodiment.

Referring now to FIG. 4D, an exemplary method is illustrated by a flow chart for training the trainable transceiver 10 using the mobile communications device 16 and without using an application on the mobile communications device 16 dedicated to training the trainable transceiver 10. The mobile communications device 16 may be configured to access the internet (e.g., it may include a transceiver, web browser, etc.). The mobile communications device 16 may receive an input from a user to navigate to a training website (e.g., one or more webpages) (step 210). The website may be implemented using one or more hardware and/or software components and/or techniques. For example, the website may be implemented using a server, networking equipment, hypertext markup language, Java script, Flash, and/or other software and/or hardware for implementing a website or webpage.

The website may be configured to receive user inputs identifying the home electronics device, remote device, and/or other device for which the user wants to train the trainable transceiver 10 to control (step 212). For example, a user may input the make, model, serial number, type of device, and/or other information about the device and/or the original transmitter 14 configured to control the device. User inputs may be provided to the website using user interface elements such as drop down menus, hyperlinks, fields, buttons, and/or other user interface elements. The website e.g., using software and/or associated hardware) may determine a particular device (e.g., make, model, etc.) that the user wants to configure the trainable transceiver 10 to control. For example, the website may search a database of devices cross referenced to corresponding information and/or characteristics. If a certain amount (e.g., above a threshold) of user input information corresponds with stored information in the database describing the device, the website may determine that the device is the one intended by the user. In some embodiments, the website may prompt the user to confirm that a particular device is the one for which the user wants to train the trainable transceiver 10. In further embodiments, the user may be prompted to choose, from a plurality of devices, the one which the user wants to train the trainable transceiver 10 to control. Other sorting, identification, searching, and/or selection algorithms may be applied by the website to the information provided by the user.

Once a particular device is identified, the website (e.g., using software and/or associated hardware) may determine activation signal parameters signal parameters, training information, and/or other information corresponding to the device the user wants to train the trainable transceiver 10 to control. For example, the website may include, have access to, query, and/or otherwise retrieve entries from a database of devices and their corresponding activation signal parameters signal parameters, training information, and/or other information. Using this information and/or other information (e.g., a signal header, signal end pattern, and/or signal formatting or protocol information), the website may format a signal for transmission to the trainable transceiver 10. The signal may be transmitted to the trainable transceiver 10 (e.g., directly or through an intermediate device such as a rear view mirror) and include activation signal parameters signal parameters, training information, and/or other information related to the device. The website as accessed on the mobile communications device 16 (e.g., using hardware of the mobile communications device 16) may transmit activation signal parameters signal parameters, training information, and/or other information related to the device using one or more of the techniques described herein. For example, the website may include instructions which when executed by the mobile communications device 16 cause the mobile communications device 16 to transmit information to the trainable transceiver 10 using a transceiver of the mobile communications device 16 (e.g., a BLE transceiver).

In one embodiment, the website may optically transmit control signal parameters to the trainable transceiver 10. The website may instruct a user to face the screen of the mobile communications device 16 towards the trainable transceiver 10 and/or a light sensor included in the trainable transceiver 10 or in communication with the trainable transceiver 10 (e.g., the website may prompt a user to face the screen of the mobile communications device 16 towards a rear view mirror). The website may, after a delay from the prompt (e.g., 3 seconds) or immediately, transmit information using light by flashing information. For example, the website may encode information into a light transmission by rapidly changing the background color of the website (e.g., from black to white). The display screen of the mobile communications device 16 may change according to the changes in the website. By manipulating the color characteristics coded to be displayed by a browser, the website may cause the mobile communications device 16 to transmit information to the trainable transceiver 10 using the light based communication techniques previously discussed herein. Alternatively, the website may load a video, display a series of images, use browser executable code, and/or otherwise cause the browser of the mobile communications device 16 to display, using a display of the mobile communications device 16, a frame buffer(s), images, video, etc. which causes a light based transmission containing information such as activation signal parameters signal parameters, training information, and/or other information related to the device to which the user wants to train the trainable transceiver 10 to control. In alternative embodiments, the transmission from the mobile communications device 16 caused by the website may be or include instructions which the trainable transceiver 10 executes causing the trainable transceiver 10 to be trained to send activation signals to a particular device (e.g., the transmission may include instructions which when executed by the trainable transceiver 10, for example through the control circuit, cause values or information to be written to specific locations in memory coupled to the control circuit of the trainable transceiver 10). Alternatively, the trainable transceiver 10 may receive activation signal parameters signal parameters, training information, and/or other information related to the device for training purposes rather than executable instructions.

In other words, the user may select a device for which the trainable transceiver 10 will be trained to operate using a website viewed on the mobile communications device 16. The website and/or associated hardware may retrieve activation signal parameters signal parameters, training information, and/or other information related to the device. The website and/or associated hardware may then configure a transmission to include this information and/or training instructions to be executed by the trainable transceiver 10. The website may then configure itself in such a way as to cause the browser and display screen of the mobile communications device to produce light in such a way as the trainable transceiver 10 recognizes the light as a transmission including activation signal parameters signal parameters, training information, and/or other information related to the device and/or executable instructions. The trainable transceiver 10 may decode the light transmission to retrieve the activation signal parameters signal parameters, training information, and/or other information related to the device and/or executable instructions from the transmission.

In other embodiments, the same or similar techniques may be used by a website to create a transmission using sound. For example, the website may cause a browser and speaker of the mobile communications device 16 to play a series of sounds encoded with activation signal parameters signal parameters, training information, and/or other information related to the device and/or executable instructions. These sounds may be received by a microphone included in the trainable transceiver 10 or otherwise accessible by the trainable transceiver 10.

Advantageously, using the website to send a transmission via the mobile communications device 16 allows a user to train the trainable transceiver 10 with the mobile communications device 16 without the need for a dedicated application. This may reduce the amount of memory of the mobile communications device 16 required to train the trainable transceiver 10. Using a website as described above may also provide an advantage in that the website may be compatible with a variety of browsers and/or operating systems without requiring substantial or any further coding, programming, or other effort to make the website compatible. This is in contrast to an application which may have to be recoded, reprogrammed, and/or otherwise altered to run on a variety of operating systems (e.g., a separate version of the application for use with each mobile communications device operating system such as iOS, Android, Windows Phone, etc.).

Referring again to FIG. 4A, the mobile communications device 16 and/or the trainable transceiver 10 may receive activation signal parameters signal parameters, training information, and/or other information related to a device from a radio frequency identification (RFID) tag 218. Using a NFC transceiver and or other inductive communication hardware, the trainable transceiver 10 and/or mobile communications device 16 may retrieve activation signal parameters signal parameters, training information, and/or other information from the RFID tag 218. For example, a user may place the mobile communications device 16 near the RFID 218 tag and retrieve activation signal parameters signal parameters, training information, and/or other information from the RFID tag 218 using NFC techniques. The mobile communications device 16 may then transmit this information to the trainable transceiver 10 using one or more of the techniques described herein (e.g., light based communication). In other embodiments, the user may place the trainable transceiver 10 near the RFID tag 218. For example, the user may place a remote user interface module of the trainable transceiver 10 which includes an NFC transceiver near the RFID tag 218 to acquire activation signal parameters signal parameters, training information, and/or other information from the RFID tag 218. In further embodiments, the RFID tag 218 may be brought into NFC communication range with the trainable transceiver 10 and/or mobile communications device 16.

The RFID tag 218 may use passive or active NFC technology. In some embodiments, the RFID tag 218 is included with the home electronics device 12, remote device 18, and/or other device by the manufacturer and includes activation signal parameters signal parameters, training information, and/or other information corresponding to the device. The RFID tag 218 may be a sticker applied to the device and/or the original transmitter 14 associated with the device. Alternatively, the RFID tag 218 may be included with the device but not attached to the device.

Using activation signal parameters signal parameters, training information, and/or other information associated with a device and retrieved from the RFID tag 218, the trainable transceiver 10 may be trained to control the device. Training the trainable transceiver 10 based on information from the RFID tag 218 may include intermediate steps such as the trainable transceiver 10 receiving the information from the mobile communications device 16 which retrieved the information from the RFID tag 218 and/or the trainable transceiver 10 configuring itself based on processing the information. In other embodiments, the RFID tag 218 may include instructions which when read are executed by the trainable transceiver 10 to train the trainable transceiver 10 to control the device and/or otherwise communicate with the device.

In some embodiments, an RFID tag 218 may be associated with the trainable transceiver 10, vehicle, and/or a vehicle having an integrated trainable transceiver. The RFID tag 218 may include identification information which identifies the trainable transceiver 10 and/or vehicle such as a fixed HTML address, serial number, vehicle identification number, and/or other identification information. In some embodiments, the RFID tag 218 may include a configuration routine. The mobile communications device 16 may read identification information and/or a configuration routine from the RFID tag 218 (e.g., using a NFC transceiver). Using the configuration routine and/or identification information the mobile communications device 16 may be paired with the trainable transceiver 10, configured to communicate with the trainable transceiver 10, configured to control the trainable transceiver 10 (e.g., through the application 170), and/or otherwise configured to perform one or more functions described herein.

In some embodiments, other techniques may be used in addition to NFC communication or in place of NFC communication to pair the mobile communications device 16 to the trainable transceiver 10. For example, a Bluetooth protocol may be used to pair the mobile communications device 16 to the trainable transceiver 10. A user may be required to enter a code into the trainable transceiver 10 and/or mobile communications device 16 to pair the two. In some embodiments, the mobile communications device 16 may be paired to the trainable transceiver 10 using the accelerometer 44 located in the mobile communications device 16 and/or rearview mirror. For example, a user may initiate a training process (e.g., by pushing a button on the trainable transceiver 10) the trainable transceiver 10 may transmit paring information and prompt a user to bump the mobile communications device 16 to the rear view mirror. Upon bumping the mobile communications device 16 to the mirror the accelerometer reading of the mobile communications device 16 may cause the mobile communications device 16 to transmit pairing information and the accelerometer reading associated with the rear view mirror may cause the trainable transceiver 10 to receive the pairing information. The two devices may then be paired. Other techniques may be used based on the accelerometer readings of the rear view mirror and/or mobile communications device 16 in order to provide a factor of authentication during the training process. For example, at the completion of the pairing process bumping the rear view mirror may be used as an additional factor of authentication which when received via the accelerometer of the rear view mirror indicates that the user has physical access to the trainable transceiver 10. The user may be prompted to bump the rear view mirror by the trainable transceiver 10 displaying a prompt on a display of the rear view mirror and/or an audio prompt. In some embodiments, the trainable transceiver 10 may include an accelerometer and be bumped instead of the rear view mirror. In further embodiments, other multifactor authentication techniques may be used when paring the mobile communications device to the trainable transceiver 10. For example, the trainable transceiver 10 may require the mobile communications device to communicate with the trainable transceiver 10 with booth a Bluetooth device and an NFC device.

In some embodiments, multifactor authentication is used to train the trainable transceiver 10 to control and/or otherwise communicate with a home electronics device, remote device, and/or other device. For example, a device may include a transceiver circuit for communication with the trainable transceiver 10 using the transceiver circuit of the trainable transceiver 10. The device may further include a transceiver operating using a Bluetooth protocol (e.g., a BLE transceiver). During the training process, the trainable transceiver 10 may be required to be in communication with the device using two radio frequency communication techniques (e.g., using both the transceiver circuit and the BLE transceiver). This may be used to provide two factors of authentication (e.g., that the trainable transceiver 10 is in proximity with the device through the Bluetooth protocol based communication and that the trainable transceiver 10 has access to identification information corresponding to the device which allows the trainable transceiver 10 to communicate with the device using a transceiver circuit). In some embodiments, the trainable transceiver 10 is configured such that it will erase activation signal parameters signal parameters, training information, and/or other information related to the device if the two factor authentication fails. In other embodiments, the device transmits encryption information, key information, activation signal parameters signal parameters, training information, and/or other information required to control the device only after the two factor authentication process is completed. In other words, the trainable transceiver 10 may have access to enough information to complete the two factor authentication procedure but not enough information to format a control signal for the device until after the device sends the missing information following the two factor authentication. Other communication techniques may be used in the above described two factor authentication process. For example, NFC transceivers may be used in place of BLE transceivers. Communications techniques may include those described with reference to FIGS. 2A-3B. Other two factor authentication techniques may be used.

In some embodiments, the mobile communications device 16 may be used as part of the two factor authentication process. For example, the mobile communications device may receive a code from a device using an NFC communication technique. The mobile communications device 16 may then transmit the code to the trainable transceiver 10 using a communications technique described herein (e.g., a BLE transceiver). This may increase the security of the training process as the user would have to have physical access to the device the trainable transceiver 10 is being trained to control and/or otherwise communicate with. This authentication factor may be used in conjunction with any other factor described herein or other authentication factors (e.g., those used in pairing two Bluetooth devices).

Figure 5:
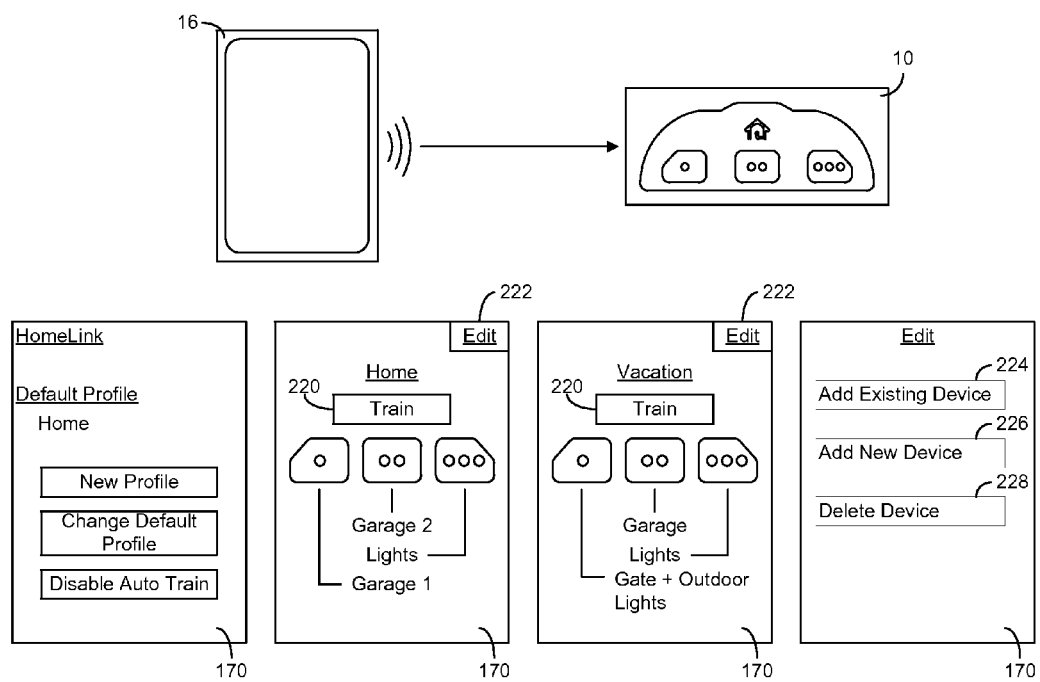
FIG. 5 illustrates an exemplary embodiment of a mobile communications device and application having a plurality of configuration profiles for training a trainable transceiver.

Referring now to FIG. 5, the mobile communications device 16 and/or the application 170 configured to run on the mobile communications device 16 may manage multiple accounts, profiles, locations, and/or other groupings of information. For example, two users could each have account with corresponding preferences, unique information, default values, etc. In some embodiments, the application 170 manages home electronics devices, remote devices, and/or other devices at two or more locations. The mobile communications device 16 and/or application 170 may communicate information being managed (e.g., as one or more profiles and/or locations) to the trainable transceiver 10. The communication may be made using one or more of the techniques described with reference to FIGS. 2A-3B (e.g., by trainable transceiver 10, by light, by sound, etc.). In one embodiment, the mobile communications device 16 and/or application 170 transmit managed information to the remote user interface module 140 of the trainable transceiver 10. The remote user interface module 140 may retransmit the information (e.g., to the base station 142).

Information being managed may include activation signal parameters, training information (e.g., device identification information), and/or other information related to the home electronics device 12, remote device 18, and/or other device. The mobile communications device 16 may transmit activation signal parameters, training information (e.g., device identification information), and/or other information related to the home electronics device 12 and/or remote device 18 using the transceiver circuit of the mobile communications device 16. Managed information may be transmitted to the trainable transceiver 10 according to one or more techniques described with reference to FIGS. 6-7B. For example, the mobile communications device 16 and/or application 170 may automatically transmit managed information to the trainable transceiver 10 when in communications range with the trainable transceiver 10. The trainable transceiver 10 and mobile communications device 16 may have been previously paired (e.g., according to a Bluetooth protocol) thus allowing for automatic communications when the mobile communications device 16 is in range of the trainable transceiver 10. Alternatively, a user may provide an input to the mobile communications device 16 to transmit the managed information to the trainable transceiver 10. As another alternative, the trainable transceiver 10 may transmit requests. The requests may be transmitted continuously, in intervals, upon triggering events (e.g., detecting a previously paired mobile communications device), in response to a user input on the trainable transceiver 10, or otherwise transmitted. The mobile communications device 16 and/or application 170 receiving the request may transmit managed information to the trainable transceiver 10 in response to the received request transmission. Advantageously, the application 170 and multiple profiles may allow a user to quickly and easily train or otherwise configure the trainable transceiver 10 based on the preferences of a user, a location in which the trainable transceiver 10 is being used, and/or otherwise configure the trainable transceiver 10 according to the preferences of a user. The application 170 may include a series of pages which allow users to create, edit, alter, or otherwise modify profiles. The application may include a page which allows a user to set default information such as a default profile. The default profile may contain information which when transmitter to the trainable transceiver 10 allows the trainable transceiver 10 to control the devices included in the default profile. For example the information may include operator input device assignments for one or more devices to be controlled, associated activation signal parameters, associated training information, and/or other associated information related to the device(s) to be controlled. In embodiments where the trainable transceiver 10 requests information from the mobile communications device 16 and/or application 170, information associated with the default profile may be automatically transmitted by the mobile communications device and/or application in response to the request. In embodiments where the mobile communications device and/or application automatically transmit information to the trainable transceiver 10, information associated with the default profile may be automatically transmitted. The user may be able to create a new profile. In some embodiments, creating a new profile includes acquiring activation signal parameters, training information, and/or other information related to a device using one or more of the techniques described above with reference to FIGS. 4A-4D (e.g., using a machine readable image to retrieve activation signal parameters for a device). Creating a new profile may also include receiving a user input assigning a device to a particular operator input device. For example, a user may assign a new device to left most button of the trainable transceiver 10. In some embodiments, a user may assign a plurality of devices to single operator input device. For example, a user may assign a motorized gate and outdoor lights to the right most button of the trainable transceiver 10. Upon receiving managed information from the mobile communications device and/or application, the trainable transceiver 10 may be configured (e.g., by receiving instructions) or configure itself (e.g., by receiving information and using the information) to send an activation signal for all devices associated with the particular operator input device. For example, the trainable transceiver 10 may be configured to send an activation signal for both a gate and outdoor lights when a user presses the right most button of the trainable transceiver 10.

In one embodiment, a settings page, configuration page, and/or other page of the application 170 user interface allows a user to see the current default profile, change the default profile, disable automatic training (e.g., automatic transmission of managed information associated with a default profile to the trainable transceiver 10 and/or transmission in response to a request from the trainable transceiver 10). A user may interact with the application 170 user interface to perform the functions described herein using gestures, fields, buttons, menus, drop down menus, and/or other user interface elements. In some embodiments, a user may swipe to the left or right to move between profiles stored in the app. One or more profiles may be stored by the application 170. In some embodiments, there is no limit to the number of profiles which may be stored. In other embodiments, there is a limit (e.g., 5) to the number of profiles that may be stored at any time.

For example, the application 170 may include two profiles, a first profile for controlling home electronic devices and/or other devices at a user's home and a second profile for controlling home electronic devices and/or other devices at a vacation home.

In some embodiments, a user may navigate (e.g., by swiping) to the desired profile and train the trainable transceiver 10 to control the devices of the profile with the associated operator input devices stored in conjunction with the profile. The user may provide an input which causes the mobile communications device 16 and/or application 170 to train the trainable transceiver 10. For example, a user may press a train button 220 found on the profile page. In response to the input, the mobile communications device 16 and/or application 170 may transmit instructions and/or information including activation signal parameters, training information and/or other information related to the devices of the profile (e.g., operator input device assignment information). The instructions and/or information may be transmitted to the trainable transceiver 10 using one or more of the techniques described above with reference to FIGS. 2A-3B. For example, the application 170 may cause a light transmission encoded with the instructions and/or information to be produced using the display or flash of the mobile communications device 16. This light transmission may be received by the trainable transceiver 10.

Advantageously, a user may quickly and easily retrain the trainable transceiver 10 using a different profile of the application 170. For example, a user may train the trainable transceiver 10 for use at home using a home profile and one of the techniques described herein. If the user leaves to go to a vacation home, the user may navigate to the vacation home profile using the application and click the train button 220. The trainable transceiver 10 may then be trained using one of the techniques described herein. A user leaving the vacation home may retrain the trainable transceiver 10 located in his or her vehicle by navigating to the home profile of the application 170 and clicking the train button 220. The trainable transceiver 10 may then be trained using one of the techniques described herein to operate the devices associated with the user's home. Thus, a user may train the trainable transceiver 10 using the mobile communications device 16 and/or application 170 for use at a variety of locations. This process may be performed more easily and/or quickly than other training procedures.

In some embodiments, a user may edit a profile. For example, a user may click on an edit button 222 associated with the profile. In some embodiments, a user may add an existing device to a profile by clicking on a button 224 labeled as such. An existing device may be a device for which the trainable transceiver 10 has already acquired activation signal parameters, training, and/or other information related to the device using one or more of the techniques described here with reference to FIGS. 4A-4C. In some embodiments, information corresponding to existing devices may be stored locally on the mobile communications device 16. In other embodiments a portion or all of the information may be stored remotely (e.g., on a server, on the trainable transceiver 10, etc.). The user may be prompted to assign the existing device which is added to the profile to a particular operator input device (e.g., button, voice command, etc.). For example, the user may be prompted to provide a voice command which when spoken will cause the associated activation signal to be sent. The application 170, mobile communications device 16, and/or trainable transceiver 10 may process the user's spoken word(s) using a microphone, baseform recognition algorithm, phoneme recognition algorithm, an/or other audio processing technique to generate a voice command associated with the device.

In some embodiments, the edit page may include an option to add a new device. For example, a user may add a new device by clicking on a button 226 labeled as such. The application 170 may prompt a user to add a new device using one or more of the techniques described by FIGS. 4A-4C. For example, the application 170 may first attempt to identify a device using an image, then using a machine readable image, and lastly through user input. Upon identifying a device, the application 170 may retrieve associated activation signal parameters, training information, and/or other information related to the device (e.g., by querying a database located on a server). A user may then be prompted to choose a profile to which the newly added device will be associated. In some embodiments, one device may be associated with a plurality of profiles. The user may also be prompted to assign the newly added device to an operator input device.

In some embodiments, the edit page may further include a delete device button 228. A user may delete a device from the application 170 (e.g., using the delete device button). The user may be prompted to select a device to delete. Deleting a device may include writing over activation signal parameters, training information, and/or other information related to the device which is stored in memory (e.g., local to the mobile communications device 16 and/or remote to the mobile communications device 16).

In some embodiments, the application 170 and associated functions described herein may be implemented using a cloud architecture. For example, the application 170 may be a cloud client with computing, information storage, and/or other functions taking place on hardware remote to the mobile communications device 16. For example, the managed information of a profile and/or other information associated with profiles and/or devices (e.g., activation signal parameters, training information, and/or other information) may be stored remote from the mobile communications device 16 running the application 170 (e.g., on a server). The local application 170 and/or mobile communications device 16 may be used solely for receiving user inputs, communicating user inputs to the remote hardware, receiving output instructions, and/or producing outputs (e.g., displaying information on the display).

In some embodiments, the application 170 may include a button or other user input device which causes the application and/or mobile communications device to send instructions and/or information to the trainable transceiver 10 for erasing the activation signal parameters, training information, and/or other information related to a home electronics device and/or remote device stored locally on the trainable transceiver 10 (e.g., in memory coupled to the control circuit). Advantageously, this may allow a user to prevent a subsequent occupant of the vehicle from controlling a user's devices. For example, a user may delete information related to a user's devices from the trainable transceiver 10 of a rental car, borrowed car, etc. such that the next occupant cannot use the trainable transceiver 10 to control the devices.

In some embodiments, the mobile communications device 16 and/or application transmits an identifier to the trainable transmitter 10 in order to designate the active profile. The trainable transceiver 10 may store managed information, activations signal parameters, training information, and/or other information related to devices of one or more profiles locally. For example, the trainable transceiver 10 may store information as profiles in memory 24 coupled to the control circuit 22 of the trainable transceiver 10. Profiles may be created, edited, managed, and/or otherwise modified using the operator input device 20 of the trainable transceiver 10. In one embodiment, a user may select an active profile and/or switch between profiles using the mobile communications device 16 and/or application 170 with the mobile communications device 16 and/or application 170 transmitting a profile identifier to the trainable transceiver 10. For example, the profile identifier may be a transmission including a number which identifies the profile the user selected with the application. Upon receiving the profile identifier, the trainable transceiver 10 may configure itself such that the activation signal parameters associated with the devices of the profile are assigned to the operator input device 20. When the user provides an input to the trainable transceiver 10 using the operator input device 20, the trainable transceiver 10 may send an activation signal corresponding to the appropriate device of the profile the user has selected using the application 170. In some embodiments, the trainable transceiver 10 may communicate with the mobile communications device 16 and/or application 170 such that the application 170 may display information about the profiles for which the trainable transceiver 10 is trained. In further embodiments, the trainable transceiver 10, a server, and/or the mobile communications device 16 may sync profile information such that a user may modify a profile on one device and have the modifications reflected on all other devices. For example, a server may profile information at a central location with the information retrieved by other devices (e.g., the trainable transceiver 10 and/or mobile communications device 16).

Advantageously, using a profile identifier may reduce the amount of memory required by the application 170 and/or use a simpler transmission signal in order to communicate between the mobile communications device 16 and trainable transceiver 10. A simpler transmission may be desirable so as to reduce error in the transmission using techniques such as light based transmission or sound based transmission.

In one embodiment, profile information and/or a profile containing other information (e.g., activation signal parameters, button or input device assignments for the activation signal parameters, etc.) may be stored on or tied to a key fob or vehicle key. The key fob or vehicle key may transmit the information and/or an identifier to the trainable transceiver 10. In one embodiment, the key fob or vehicle key transmits activation signal parameters for one or more devices along with operator input device assignments for the activation signal parameters. For example, the key rob or vehicle key transmits information which the trainable transceiver 10 receives and uses to format activation signals for particular devices based on user input from a button corresponding to the device as determined based on the information. The key fob or vehicle key may transmit this information automatically when the key fob or key is within transmission range of the trainable transceiver 10. In other embodiments, the key fob or vehicle key transmits this information in response to a request transmission from the trainable transceiver 10. The request transmission may be sent by the trainable transceiver 10 periodically, continuously, in response to the powering on, in response to a vehicle being started, in response to a user input corresponding to sending an activation signal (e.g., pushing a button), and/or otherwise be sent based on a schedule or triggering event.

In one embodiment, the key fob, vehicle key, mobile communications device 16, and/or other device transmits identification information only. The trainable transceiver 10 may receive this identification information from the key fob or vehicle key. In some embodiments, the trainable transceiver 10 receives the identification information indirectly such as through a vehicle electronics system in communication with the key fob or vehicle key. The trainable transceiver 10 may store activation signal parameters, button assignments, and/or information such that the information is tied to a particular key fob or vehicle key. When the trainable transceiver 10 receives identification information from the key fob or vehicle key, the trainable transceiver 10 may configure itself to send activation signal parameters based on the activation signal parameters and/or button assignments stored with respect to that identification information. For example, the trainable transceiver 10 may receive first identification information identifying a first key rob. In response, the trainable transceiver 10 may configure itself to send activation signals based on a first set of activation signal parameters and/or button assignments. The trainable transceiver 10 may then receive a second identification information identifying a second key fob. In response, the trainable transceiver 10 may configure itself to send activation signals based on a second set of activation signal parameters and/or button assignments.

The above techniques may allow the trainable transceiver 10 to automatically configure itself based on the identification information to correspond to multiple user's preferences and/or configurations. For example, a first user may have three button configured to open a first garage door opener, open a second garage door opener, and turn on lights respectively. When the first user operates a vehicle, the trainable transceiver 10 associated with the vehicle may automatically configure itself to perform these functions with these buttons in response to the identification information, activations signal parameters, button assignment information, and/or other information received from a first key fob. When a second user operates the vehicle, the trainable transceiver 10 may be configured in a different configuration in response to identification information, activations signal parameters, button assignment information, and/or other information received from a second key fob. For example, the buttons may be configured to open the second garage door opener, turn on the lights, and turn on a stereo respectively.

Figure 6:
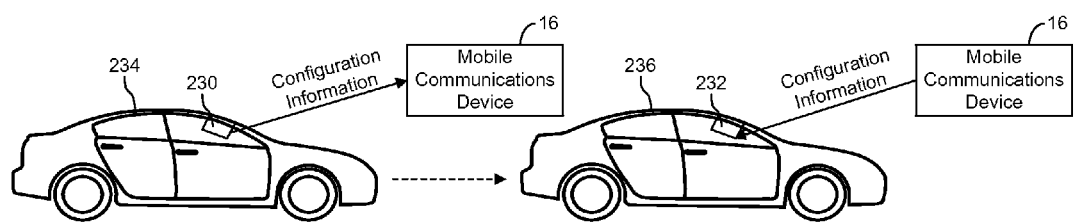
FIG. 6 illustrates an exemplary embodiment of transferring configuration information from a first trainable transceiver to a second trainable transceiver using a mobile communications device.

Referring now to FIG. 6, the mobile communications device 16 may be used to transfer activation signal parameters, training information, profiles, and/or other information related to home electronics devices and/or remote devices from a first trainable transceiver 230 to second trainable transceiver 232. Using one or more of the techniques described with reference to FIGS. 2A-3B, the trainable transceiver 230 of the first vehicle 234 and the mobile communications device 16 may communicate. The mobile communications device 16 may receive activation signal parameters, training information, profiles, and/or other information related to home electronics devices and/or remote devices from the first trainable transceiver 230. A user may bring the mobile communications device 16 within communications range of the second trainable transceiver 232 (e.g., a trainable transceiver in a second vehicle 236). The mobile communications device 16 and the second trainable transceiver 232 may communicate using one or more techniques described with reference to FIGS. 2A-3B. The second trainable transceiver 232 may receive activation signal parameters, training information, profiles, and/or other information related to home electronics devices and/or remote devices from the mobile communications device 16.

In one embodiment, communication between the mobile communications device 16 and the trainable transceiver 230 or 232 may be initiated by the mobile communications device 16. For example, the mobile communications device 16 may send a request for information to the trainable transceiver 230 or 232. In some embodiments, the mobile communications device 16 may initiate communication with trainable transceiver 230 or 232 automatically. For example, the mobile communications device may periodically send out a signal and a trainable transceiver 230 or 232 responds, the mobile communications device 16 may determine that it is in range of the trainable transceiver 230 or 232. After determining that the trainable transceiver 230 or 232 is in range, the mobile communications device 16 may initiate communication with the trainable transceiver 230 or 232. In other embodiments, the mobile communications device 16 may initiate communication with the trainable transceiver 230 or 232 in response to a user input. For example, a user may provide an input to the mobile communications device 16 using an application. In response to the input, the mobile communications device 16 may initiate communication. For example, the mobile communications device 16 may send a request for the trainable transceiver 230 or 232 to transmit information to the mobile communications device 16, the mobile communications device 16 may transmit instructions and/or information to the trainable transceiver 230 or 232, etc.

In other embodiments, communication between the mobile communications device 16 and the trainable transceiver 230 or 232 may be initiated by the trainable transceiver 230 or 232. This may occur automatically as described above (e.g., the trainable transceiver 230 or 232 may detect when the mobile communications device 16 is within communications range and initiate communications). Alternatively, the trainable transceiver 230 or 232 may initiate communications with the mobile communications device 16 upon receiving a user input (e.g., receiving a user input through an operator input device).

Figure 7A:
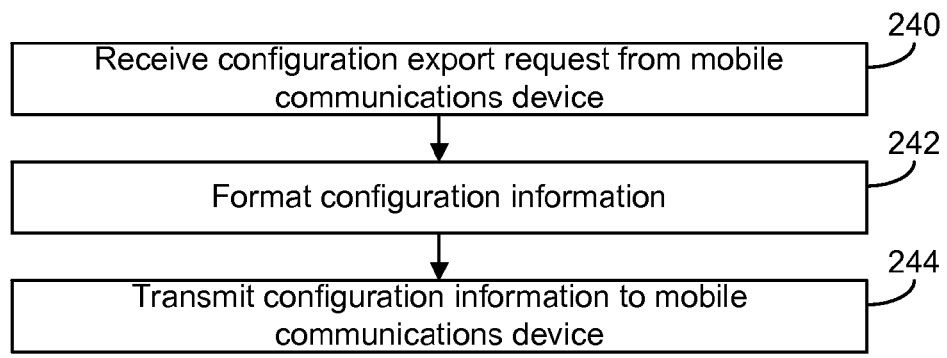
FIG. 7A illustrates a flow chart for exporting configuration information from a trainable transceiver to a mobile communications device according to an exemplary embodiment.

Referring now to FIG. 7A, a flow chart illustrates an exemplary embodiment of the mobile communications device 16 retrieving configuration information from the first trainable transceiver 230. Configuration information may include activation signal parameters, training information, profiles, and/or other information related to home electronics devices and/or remote devices. The trainable transceiver 230 may receive a configuration export request from the mobile communications device 16 (step 240). For example, the mobile communications device 16 may generate a configuration export request in response to a user input corresponding to a request to copy the configuration of the current trainable transceiver. Continuing the example, the mobile communications device 16 may transmit the request to the trainable transceiver 230 using a Bluetooth protocol. The trainable transceiver 230 may receive the configuration export request transmission from the mobile communications device 16 using a BLE transceiver (e.g., one coupled to the control circuit of the trainable transceiver 230 or otherwise accessible to the trainable transceiver).

Upon receiving the configuration export request, the trainable transceiver 230 may format the configuration information (step 242). For example, the control circuit of the trainable transceiver 230 may read from memory coupled to the control circuit data related to activation signal parameters, training information, profiles, and/or other information related to home electronics devices and/or remote devices stored in the memory. The control circuit may generate a message for transmission to the mobile communications device 16 using this and/or other information (e.g., communications protocols, information identifying the mobile communications device 16, etc.).

The trainable transceiver 230 may then transmit the configuration information to the mobile communications device (step 244). For example, the trainable transceiver 230 may transmit the configuration information to the mobile communications device 16 using a Bluetooth protocol and BLE transceiver included in or otherwise accessible to the trainable transceiver 230. Alternatively, the above described steps may be carried out in response to a user input received by the trainable transceiver 230. The trainable transceiver 230 may initiate communication as described above.

Figure 7B:
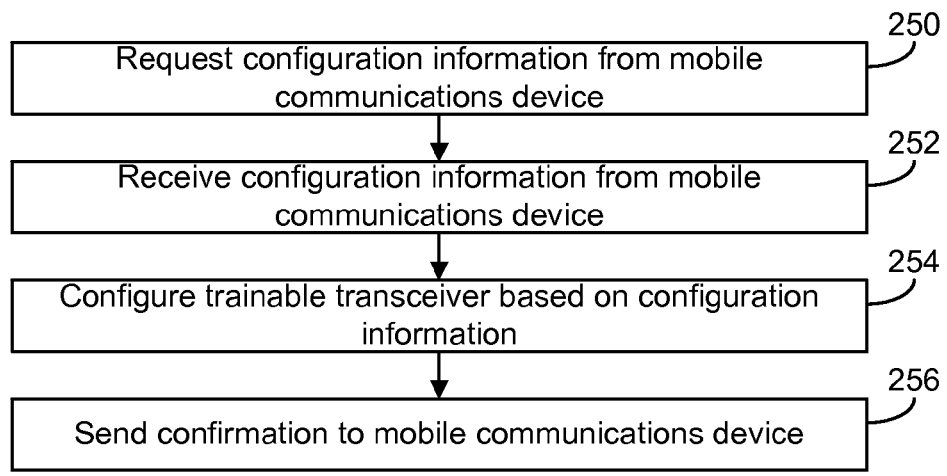
FIG. 7B illustrates a flow chart for a trainable transceiver requesting configuration information from a mobile communications device and using the information received in training the trainable transceiver according to an exemplary embodiment.

Referring now to FIG. 7B, a flow chart illustrates an exemplary embodiment of the second trainable transceiver 232 receiving configuration information from the mobile communications device 16. The trainable transceiver 232 may request configuration information from the mobile communications device 16 (step 250). For example, the trainable transceiver 232 may send the request automatically when it detects that the mobile communications device 16 is within communications range. Or, the trainable transceiver 232 may send a request for configuration information to the mobile communications device 16 in response to a user input received at the trainable transceiver 232 (e.g., a user input through an operator input device corresponding to copying configuration information from the mobile communications device 16). The request may be sent according to one or more of the communications techniques described herein (e.g., using a BLE transceiver). In alternative embodiments, the mobile communications device 16 may send the configuration information without first receiving a request from the trainable transceiver 232.

The second trainable transceiver 232 may receive configuration information from the mobile communications device 16 (step 252). In some embodiments, the configuration information may be received in response to a request for configuration information. In other embodiments, configuration information may be received unprompted from the mobile communications device 16. For example, a request sent from the trainable transceiver 232 may result in configuration information being transmitted to the trainable transceiver 232 from the mobile communications device 16 reviewing the request. The trainable transceiver 232 may receive the configuration information using the same (e.g., BLE) or a different (e.g., light based) communication technique as was used to send the request. In one embodiment, the configuration received is in the form of information. In other embodiments, the configuration information received is in the form of executable instructions or includes executable instructions along with information.

The trainable transceiver 232 may use the received configuration information to configure itself (step 254). For example, the information may be stored in memory and the control circuit may read the memory and apply activation signal parameters, training information, profiles, and/or other information related to home electronics devices and/or remote devices such that the control circuit may format control signals to be sent to the corresponding devices using the transceiver circuit. Alternatively, instructions received from the mobile communications device 16 may be executed by the control circuit cause the trainable transceiver 232 to configure itself. This may include writing values to memory based on activation signal parameters, training information, profiles, and/or other information related to home electronics devices and/or remote devices received from the mobile communications device 16. Upon executing the instructions, the trainable transceiver 232 may be configure to control the devices associated with the configuration information received from the mobile communications device 16.

In some embodiments, the trainable transceiver 232 may send a confirmation transmission to the mobile communications device 16 indicating that the trainable transceiver 232 has been successfully configured based on the information and/or instructions received from the mobile communications device 16 (step 256). The mobile communications device 16 may display a confirmation message to a user. In some embodiments, the trainable transceiver 232 does not send a confirmation transmission. The trainable transceiver 232 may provide confirmation to a user (e.g., by displaying a confirmation message, producing an output (e.g., a noise), etc.). The techniques and steps described in reference to FIGS. 6-7B may be used to copy the configuration of the first trainable transceiver 230 to the second trainable transceiver 232 using the mobile communications device 16.

Referring generally to FIGS. 6-7B, similar techniques may be used to allow a user to carry one or more trainable transceiver configurations with himself or herself using the mobile communications device 16 and/or an application. The mobile communications device 16 and/or an application running on the mobile communications device may store configuration information. The mobile communications device 16 and/or application may identify the trainable transceiver 232 and cause the trainable transceiver 232 to be configured to operate a user's home electronic devices, remote devices, and/or other devices. For example, the mobile communications device 16 may initiate communication with the trainable transceiver 232 when it is within communications range as described with reference to FIG. 6. Upon initiating communication with the trainable transceiver 232, the mobile communications device 16 may receive identifying information from the trainable transceiver 232. For example, identifying information may include a vehicle identification number corresponding to a vehicle in which the trainable transceiver 232 is installed and/or in communication with, a serial number of the trainable transceiver 232, a media access control (MAC) address of a Bluetooth transceiver included in the trainable transceiver 232 or otherwise used by the trainable transceiver 232, and/or other information identifying a trainable transceiver 232 and/or associated vehicle 236.

Once the mobile communications device 16 and/or application has identified the trainable transceiver 232, the mobile communications device 16 may provide the trainable transceiver 232 with activation signal parameters, training information, profiles, and/or other information related to home electronics devices and/or remote devices. This essentially allows a user to carry a trainable transceiver configuration with them. In some embodiments, the information provided by the mobile communications device 16 depends on the identification information corresponding to the trainable transceiver 232 and/or vehicle 236. For example, the mobile communications device 16 may associate particular profiles with particular trainable transceivers and/or vehicles. Based on the identification information received, the mobile communications device 16 may provide the trainable transceiver 232 with one or more profiles and/or associated information linked to that vehicle and/or transceiver by a user. For example, a user may assign a profile to the first vehicle 234 and assign a second profile to the second vehicle 236. The trainable transceiver 232 may be configured based on the information received from the mobile communications device 16 as previously described. In some embodiments, the trainable transceiver 232 is configured such that it only temporarily stores information from the mobile communications device 16. For example, each time the trainable transceiver 232 formats an activation signal for transmission to a device, the trainable transceiver 232 may request activation signal parameters from the mobile communications device 16 in communication with the trainable transceiver 232. Upon sending the activation signal, the trainable transceiver 232 may erase (e.g., write over) the data stored in the memory of the trainable transceiver 232 corresponding to the activation signal parameters. Advantageously, this may allow a user to use the trainable transceiver 232 in any vehicle while maintaining the activation signal parameters on the mobile communications device 16. This may provide an advantage in that access to the activation signal parameters of the user's devices is managed in such a way as to prevent others from accessing the information.

For example, this may allow a user to rent a car and use a trainable transceiver associated with the rental car. The trainable transceiver of the rental car may access activation signal parameters and/or other information about the user's devices from the mobile communications device in communication with the trainable transceiver. However, these values are erased from the local memory of the trainable transceiver after having been transmitted and are not acquired until a transmission is ready to be sent (e.g., after a user provides an input via the operator input device such as pushing a button). Thus, when the user returns the rental car, the trainable transceiver of the rental car will be unable to send an activation signal to the user's device as it will not be in communication with the user's mobile communications device. This may provide an advantage in that the next user of the rental car will be unable to access activation signal parameters, training information, profiles, and/or other information related to home electronics devices and/or remote devices of the first user.

In other embodiments, other techniques may be used in place of or in conjunction with the one described above to control access to information. For example, the trainable transceiver 10 may erase activation signal parameters, training information, profiles, and/or other information related to home electronics devices 12 and/or remote devices 18 when the trainable transceiver 10 is no longer in communication with the mobile communications device 16 (e.g., when the two are no longer paired via a Bluetooth protocol). The trainable transceiver 10 may store activation signal parameters, training information, profiles, and/or other information related to home electronics devices 12 and/or remote devices 18 locally but periodically erase this information and prompt the user to provide it again. Other techniques are possible.

In some embodiments, the mobile communications device 16 and/or application may determine if the trainable transceiver 10 is a known or trusted trainable transceiver and/or associated with a known or trusted vehicle. For example, the mobile communications device and/or application may maintain a database of known trainable transceivers including identifying information for the trainable transceivers. A user may designate a trainable transceiver as trusted or known using the mobile communications device and/or an application running on the mobile communications device. The database may be maintained on a server or other remote source in some embodiments. The database may be editable by a user through a web browser (e.g., the user may have login credentials for a website configured to manage the list of the trusted or known trainable transceivers). In some embodiments, a user may be prompted (e.g., by an application) to identify a trainable transceiver as known or trusted when the mobile communications device running the application determines that it has connected to a trainable transceiver for the first time and/or the trainable transceiver is not in the database of known or trusted trainable transceivers.

In some embodiments, known or trusted trainable transceiver 10s store activation signal parameters, training information, profiles, and/or other information related to home electronics devices and/or remote devices in locally accessible memory. This may provide an advantage in that the trainable transceiver 10 may function without communicating with a mobile communications device of the user (e.g., a user who has forgotten their mobile communications device).

Generally, a user may provide information about a home electronics device, remote device, and/or other device to the trainable transceiver 10 system, and the trainable transceiver 10 system may display training instructions to the user based on this information. This function may be carried out using the cloud and/or an application (e.g., cloud client) running on the device used by the user to provide the information about the device the user is training the trainable transceiver 10 to control. Alternatively, this function may be carried out by an application running locally on the device and without accessing a cloud (e.g., the application is a program stored in local device memory and executed using local device computing hardware and resources).

A variety of devices may be used to receive the user input and/or display the training instructions. For example, user input, including information about the device for which the trainable transceiver 10 is to be trained, may be received by a mobile communications device. The mobile communications device may be running a cloud client such as an application. Using the application and an input mechanism (e.g., voice commands, touchscreen input, etc.), the user may provide information about the device for which training information is sought. The trainable transceiver 10 may receive the user input. For example, the trainable transceiver 10 may receive user input via an operator input device. In some embodiments, the trainable transceiver 10 may include a cloud client which is used in conjunction with the operator input device (e.g., buttons, a touch screen, etc.) to receive input from a user. In some embodiments, the trainable transceiver 10 may be in communication with the mobile communications device 16, rear view mirror of a vehicle, center stack of a vehicle (e.g., infotainment system) and/or other hardware. The device(s) in communication with the trainable transceiver 10 may be used to receive user input (e.g., including information about the device for which the trainable transceiver 10 is to be trained). For example, a user may enter information about the device using a touchscreen forming part of an infotainment system. the rear view mirror may include an operator input device such as a series of buttons or touchscreen for receiving user input. In some embodiments, other electronic devices may be used to receive information (e.g., including information about the device for which the trainable transceiver 10 is to be trained) from a user. For example, a user may enter information about the device using a personal computer (e.g., a desktop located in the user's home).

In some embodiments, information about the device for which the trainable transceiver 10 is to be trained may include information such as activation signal parameters, training information (e.g., device identification information), and/or other information related to a home electronics device and/or remote device. In other embodiments, the information received from the user may be only device identification information such as make, model, serial number, Federal Communications Commission identification number, and/or other information identifying a home electronics device, remote device, and/or other device. In some embodiments, the user may enter this information using an input device and/or a graphical user interface. For example, a user may select from a list of available devices in order to provide identification information such as make and model. A user may enter information in a field or fields, select information using a dropdown menu, and/or otherwise provide the information. In some embodiments, identification information may be, include, or be determined from a machine readable image. For example, a user may scan a quick reference code, barcode, or other machine readable image using a camera, light sensor, and/or other device included in the device the user is using to input information (e.g., the user may scan a machine readable image using a camera included in the mobile communications device 16 and/or the application used for entering information). In some embodiments, the machine readable image is decoded locally in order to access information (e.g., device identification information). In other embodiments, the machine readable image may be transmitted to a remote location for decoding. For example, the device receiving user input (e.g., the trainable transceiver 10) may transmit the machine readable image to the cloud for decoding. The machine readable image may be decoded using one or more algorithms (e.g., object recognition algorithms, image processing algorithms, etc.). In some embodiments, the information input by the user may be found on a home electronics device, remote device, and/or other device, in a manual associated with the device, on a website of the manufacturer of the device, and/or in other locations.

In some embodiments, the trainable transceiver 10 may determine device identification information for a home electronics device, remote device, and/or other device for which the trainable transceiver 10 is being trained to operate. For example, a user may place the trainable transceiver 10 in a training mode (e.g., through a user input). The trainable transceiver 10 may then detect device identification information for a device. In one embodiment, the trainable transceiver 10 may send a transmissions using a variety of transmission parameters (e.g., frequency, channels, etc.) and/or activation signal parameters. If the trainable transceiver 10 receives an acknowledgement transmission from a device, the trainable transceiver 10 may determine device identification information based on the acknowledgement received. For example, the acknowledgement received may include device identification information. Alternatively, the trainable transceiver 10 may use the transmission parameters and/or activation signal parameters of the transmission which triggered the acknowledgement transmission from the device. For example, the trainable transceiver 10 may access a database (e.g., locally and/or on remote hardware/device) which stores device identification information with transmission parameters and/or activation signal parameters. Using the database, the trainable transceiver 10 may retrieve device identification information for use in the functions described herein. Alternatively or additionally, the database may include training information indexed to transmission parameters and/or activation signal parameters. The trainable transceiver 10 may receive training information form the database for use in the functions described herein. In some embodiments, the trainable transceiver 10 transmits the identification information and/or training information to another device. For example, the trainable transceiver 10 may transmit identification information to the mobile communications device 16 which then displays training information using one or more of the techniques described herein.

In some embodiments, the device receiving the user input may process the user input locally rather than transmitting the information. The device may process the identification information to determine or otherwise access training information corresponding to the device. Training information may include step-by-step instructions for training the trainable transceiver 10 to control the device, instructions for placing the device in a learning mode, communication frequencies and/or other activation signal parameters which allow the trainable transceiver 10 to communicate with and/or control the device, and/or other information related to training the trainable transceiver 10 to control the device. For example, the device may cross reference received identification information with a database storing identification information for a plurality of devices. Upon determining that the received identification information matches or otherwise corresponds to stored identification information, the device may retrieve training information stored in the database which corresponds to the identification information stored in the database. In some embodiments, additional steps and/or techniques may be included in accessing training information. For example, the device may communicate with a remotely stored database in order to retrieve information.

In embodiments where the device receiving the user input does not transmit the user input to a remote location, the training information may be read from memory and/or otherwise accessed.

The training information may be displayed on the device that received the input and/or another device (e.g., the device receiving the training information, a device in communication with the device which received the training information, and/or other devices). The trainable transceiver 10 may display the training information on a display included in the trainable transceiver 10. The mobile communications device 16 may display the training information on a display included in the mobile communications device 16. In some embodiments, the mobile communications device 16 may receive the training information from another device. For example, the mobile communications device 16 may receive the training information from trainable transceiver 10 which is in communication with the mobile communications device 16. In further embodiments, the mobile communications device 16 may transmit training information to the trainable transceiver 10, rear view mirror, and/or vehicle center stack (e.g., vehicle infotainment system) for display. For example, the mobile communications device may communicate training information to one or more of the proceeding using Bluetooth. In some embodiments, the trainable transceiver 10 included in or otherwise in communication with a rear view mirror 70 may display the training information on a display 80 included in the rear view mirror 70. In other embodiments, the trainable transceiver 10 included in or otherwise in communication with a vehicle center stack (e.g., infotainment system) may display the training information on a display included in the center stack of the vehicle. A personal computer of other electronic device may display the training information on a display included therein. In some embodiments (e.g., where the other electronic device is a personal computer), the other electronic device may be coupled with or otherwise in communication with a printer. The other electronic device may print the training information. Advantageously, this may allow a user to take training information with himself or herself to the trainable transceiver 10 and/or device for which the trainable transceiver 10 is being trained. This may provide an advantage in that the user will have the instructions at the location where the trainable transceiver 10 is being trained. In further embodiments, training information may be provided to the user by one or more of the above devices using a speaker. The training information may include audible instructions produced by a speaker of the device having the training information.

In some embodiments, the home electronics device 12, remote device 18, and/or other device may be and/or include a wireless access point. For example, the wireless access point may be a mini access point. The wireless access point may operate on a WiFi protocol (e.g., an IEEE 802.11 protocol), create a network, and/or otherwise allow for communication between the device and other devices such as the trainable transceiver 10. In some embodiments, the device and/or wireless access point is not connected to the internet. In other embodiments, the device and/or wireless access point is connected to the internet. In further embodiments, the wireless access point may be implemented with another device such as a router to which other devices (e.g., home electronics devices 12, remote devices 18, trainable transceivers 10, mobile communications devices 16 and/or other devices) connect to a network.

The wireless access point and/or the network created by the wireless access point may be encrypted, password protected, and/or otherwise secured (e.g., using an IEEE 802.11 security algorithm such as Wired Equivalent Privacy (WEP), WiFi Protected Access II (WPA2), etc.). In some embodiments, the mobile communications device 16 may connect to the network using a password. The trainable transceiver 10 may also connect to the wireless network. In some embodiments, the password for the wireless network may be printed on the wireless access point and/or the device including the hardware creating the wireless access point. For example, the wireless access point may be created by a garage door opener with the password (e.g., WPA2 password) printed on the garage door opener. In some embodiments, the wireless access point may include software, firmware, computer programs, executable instructions, and are other information (e.g., stored in memory) which allows a connected device to access information about the wireless access point, a device creating the wireless access point, and/or devices connected to the wireless access point using a web browser interface. In some embodiments, the wireless access point stores in memory, local to the wireless access point, activation signal parameters signal parameters, training information, and/or other information related to the device including the wireless access point. In other embodiments, activation signal parameters signal parameters, training information, and/or other information related to the home electronics device 12 and/or remote device 18 is stored locally to the device and is accessible via a connection between that device and a wireless access point.

For example, a garage door opener may establish a wireless network and function as a wireless access point. A mobile communications device 16 may connect to the wireless network/wireless access point (e.g., using a WiFi transceiver). Using a web browser and/or other application on the mobile communications device 16, a user may access instructions for training the trainable transceiver 10 to control the garage door opener. The mobile communications device 16 may also access activation signal parameters signal parameters, training information, and/or other information related to the garage door opener. The mobile communications device 16 may use the information to display training instructions to a user on the display of the mobile communications device 16 and/or otherwise train the trainable transceiver 10. The information accessed by the mobile communications device 16 may be stored locally on a device including a wireless access point and/or connected to a wireless access point.

In some embodiments, the mobile communications device 16 may use information accessed via the wireless access point to train the trainable transceiver 10 which is in communication with the mobile communications device 16. For example, the mobile communications device 16 may use the information form the wireless access point to create instructions and/or information which cause the trainable transceiver 10 to be trained to control the device using one or more the of techniques described herein (e.g., the trainable transceiver 10 executes instructions received from the mobile communications device 16). The mobile communications device 16 may communicate information and/or instructions to the trainable transceiver 10. In other embodiments, a user may enter information visible through the web browser into the trainable transceiver 10 and/or an application of the mobile communications device 16 manually. The manually entered information may be communicated to the trainable transceiver 10 using the mobile communications device 16 and/or otherwise used by the trainable transceiver 10 in order to configure the trainable transceiver 10 to control the device associated with the information. In further embodiments, the trainable transceiver 10 may connect to the wireless access point directly (e.g., using a WiFi transceiver). The trainable transceiver 10 may acquire activation signal parameters signal parameters, training information, and/or other information related to a device running the wireless access point and/or connected to the wireless access point. The trainable transceiver 10 may use this information to configure itself to control one or more devices.

In some embodiments, the device creating the wireless access point and/or devices connected to the wireless access point may be controlled using a web browser and an additional device connected to the wireless access point such as the trainable transceiver 10 and/or mobile communications device 16 which runs the web browser. The device running the web browser may connect automatically to the network created by the wireless access point when the device running the web browser comes into communications range of the wireless access point (e.g., the device detects the network created by the wireless access point). For example, as a vehicle drives towards a garage door opener including and/or functioning as a wireless access point, a mobile communications device 16 that has previously connected to the wireless access point may automatically connect to the wireless access point.

Once connected to the wireless access point (e.g., through the network created by the wireless access point), the device including the web browser (e.g., the trainable transceiver 10, vehicle electronics system such as infotainment system, mobile communications device 16, and or other device) may control the home electronics device 12, remote device 18, and/or other device connected to the wireless access point using a web browser. For example, the web browser may be used to change a parameter of a device connected to the wireless access point, send an instruction to the device, and/or otherwise communicate with the device. Upon receiving the communication, the device may interpret the communication in such a way as to allow the device to be controlled by the web browser and associated communication. For example, a garage door opener may function as or include a wireless access point. Upon connecting to the garage door opener, a device running a web browser may be presented with a graphical user interface based on information communicated from the garage door opener. The web browser may then be used in conjunction with the graphical user interface to communicate instructions to the garage door opener. For example, a user may use the web browser to press a button corresponding to closing the garage door. Pressing the button may send corresponding information to the garage door opener that the user has pushed the button. The garage door opener may use this information to activate the garage door opener and close the garage door.

Using the web browser interface, the device creating and/or including the wireless access point may transmit information to the device running the web browser and cause it to display the information via the web browser. For example, the wireless access point may send information such as status information related to the home electronics device 12, remote device 18, and/or other device that causes the web browser to refresh and display the information. Continuing the example, the wireless access point may be a garage door opener which transmits (e.g., serves) information to the mobile communications device 16 connected to the wireless access point. This information may be that the garage door is down. The web browser may refresh and display this information to a user on the display of the mobile communications device 16 as part of a graphical user interface (e.g., text, icons, images, etc.).

The above described examples describe the web browser as running on the mobile communications device 16. In some embodiments, the web browser runs on the trainable transceiver 10 including a WiFi transceiver which allows the trainable transceiver 10 to connect to the access point. The web browser may be displayed on a display included in the trainable transceiver 10 and/or otherwise accessible to the trainable transceiver 10 (e.g., a display in a rear view mirror). In other embodiments, the web browser may be running on a vehicle electronic system such as an infotainment system where the vehicle includes a WiFi transceiver allowing the vehicle to connect to the wireless access point. Using the above described techniques, a wireless access point may be used to communicate activation signal parameters signal parameters, training information, and/or other information related to the home electronics device 12 and/or remote device 18 to the trainable transceiver 10 for use in training the trainable transceiver 10. Additionally, the wireless access point may be used to control one or more home electronics device 12 and/or remote devices 18 using a web browser.

In further embodiments, one or more of the above described techniques may be used to place the home electronics device 12, remote device 18, and/or other device into a training mode. For example, a web browser on the mobile communications device 16 may be used to send information to the wireless access point and/or the home electronics device 12 or remote device 18 to place the device into a training mode. Upon receiving the information, the device may enter a training mode. When in the training mode, the device (e.g., garage door opener) may be configured to receive an activation signal from a transceiver. The activation signal received during the training mode may be used to configure the device (e.g., garage door opener) to be controlled by an activation signal having the activation signal parameters of the activation signal received during the training mode. For example, the activation signal parameters of the activation signal received during the training mode may be saved in memory local to the device (e.g., garage door opener). Following the training mode, the garage door opener may be configured to only be controlled by an activation signal having the activation signal parameters stored in memory. In some embodiments, the web browser may be used to exit the training mode. In other embodiments, the training mode may end after a predetermined amount of time (e.g., 30 seconds) and/or when an activation signal is received. Other techniques may be used to control the training mode of the device.

In some embodiments, the home electronics device 12, remote device 18, and or other device may be controlled and/or communicated with using a communication technique based on the internet and/or a telephone network (e.g., wired or wireless such as a cellular network). For example, a device may have an internet standard messaging address, be configured to receive communications using an internet message format standard, be configured to receive a message using a simple mail transfer protocol, receive a message using an internet instant messaging protocol, receive an e-mail, have a host name, and/or otherwise receive a communication using the internet and/or another network. To carry out one or more of these functions, the device may include networking hardware such as a networking card, be connected to internet (e.g., via a wired connection to a router or modem or a wireless connection to a router or modem suing a transceiver such as a WiFi transceiver), and/or otherwise include hardware and/or software for communicating using one or more of the above communications techniques. Alternatively or additionally, the device may be configured to receive SMS messages, fax messages, voice over internet protocol (VoIP) communications, and/or otherwise receive communications over a wired or wireless (e.g., cellular) telephone and/or data network. To carry out one or more of these functions, the device may include a cellular transceiver, wired connection to a telephone line, access to the internet (e.g., through a WiFi transceiver), and/or other hardware and/or software to carry out the above described communications techniques. In some embodiments, the above described communications techniques may allow the device to send communications as well as to receive communications.

Using one or more of the above described communications techniques, the mobile communications device 16 may be able to control the home electronics device 12, remote device 18, and/or other device. Controlling the home electronics device 12, remote device 18, and/or other device may include such actions as placing the device into a training mode, causing the device to activate, causing the device to change status, causing the device to send a communication (e.g., send status information), and/or otherwise causing the device to take an action. In some embodiments, the device may be controlled (e.g., activated) based on receiving a communication using one of the above described techniques. For example, a garage door opener may be configured to activate a motor to open or close the garage door upon receiving an SMS message. The mobile communications device 16 may send the SMS message through a messaging feature and/or through an application. In some embodiments, the address (e.g., telephone number) of the garage door opener is received by the mobile communications device 16 during a training process. In other embodiments, the address may be manually entered by a user (e.g., the address may be provided in a user manual, printed on the device, etc.). In other embodiments, the content of the SMS message received controls the device. For example, the content of the SMS message may include a rolling code or other encryption component and/or a command component such as instruction to raise the garage door. Similar techniques (e.g., controlling the device based on the presence of the communication or content of the communication) may be used with other of the described communication techniques (e.g., e-mail wherein the device has an e-mail address). The information related to controlling a device using one or more of these techniques may be provided to the mobile communications device 16 using one or more of the training processes or techniques previously described and/or other training techniques.

In other embodiments, a device other than the mobile communications device 16 may communicate with the home electronics device 12 or remote device 18 using one or more of the above described techniques. For example, the trainable transceiver 10 may include a cellular transceiver or other hardware which allows the trainable transceiver 10 to communicate over the internet and/or over a telephone and/or data network. Continuing the example, the trainable transceiver 10 may send a SMS message to device in response to a user input via a cellular transceiver. The SMS message may control the device which receives the message. Part of the training of the trainable transceiver 10 may include acquiring address information, telephone information, and/or other information which allows the trainable transceiver 10 to communicate with the device using one or more of the above described techniques.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling a remote device, comprising:
   (a) a mobile communications device comprising:
      a display;
      a camera; and
      a processing circuit coupled to the display and the camera, wherein the processing circuit is configured to determine training information for the remote device based on an image, wherein the image comprises an image provided by the camera; and
   (b) a trainable transceiver comprising:
      a transceiver circuit;
      a communications device; and
      a control circuit coupled to the transceiver circuit and the communications device,
   wherein the trainable transceiver is configured to be in communication with the mobile communications device using the communications device, and wherein the control circuit is configured to receive training information based on an image from the mobile communications device and train the trainable transceiver to communicate with the remote device based on the training information.

2. The system of claim 1, wherein the processing circuit is configured to determine the training information for the remote device based on an image of an original transmitter associated with the remote device.

3. The system of claim 1, wherein the processing circuit is configured to determine the training information for the remote device based on an image of a machine readable image associated with an original transmitter associated with the remote device.

4. The system of claim 1, wherein the mobile communications device further comprises a user input device coupled to the processing circuit, and wherein the processing circuit is configured to determine training information for the remote device based on user input received from the user input device.

5. The system of claim 4, wherein the user input includes at least one of a make, a model, a model number, and an identification number of an original transmitter associated with the remote device.

6. The system of claim 4, wherein the user input includes at least one of a make, a model, a model number, and an identification number of the remote device.

7. The system of claim 1, wherein the mobile communications device is configured to access a website, wherein the mobile communications device is configured to provide a user input received by the mobile communications device to the website, and wherein the display of the mobile communications device is configured to send a light transmission in response to information received from the website.

8. The system of claim 7, wherein the user input includes at least one of a make, a model, a model number, and an identification number of an original transmitter associated with the remote device.

9. The system of claim 7, wherein the mobile communications device determines training information for the remote device using a cloud architecture.

10. A trainable transceiver for installation in a vehicle and for controlling a remote device, comprising:
 a transceiver circuit; and
 a control circuit coupled to the transceiver circuit,
 wherein the control circuit is configured to be in communication with a mobile communications device that is equipped with a camera, and wherein the control circuit is configured to communicate with the mobile communications device for receiving training information based on an image provided by the camera of the mobile communication device, for use in training the trainable transceiver to communicate with the remote device.

11. The apparatus of claim 10, wherein the mobile communications device is configured to determine the training information for the remote device based on an image of an original transmitter associated with the remote device.

12. The apparatus of claim 10, wherein the mobile communications device is configured to determine the training information for the remote device based on a machine readable image associated with the original transmitter associated with the remote device.

13. The apparatus of claim 10, wherein the mobile communications device is configured to determine training information for the remote device using an application running on the mobile communications device.

14. The apparatus of claim 10, wherein the control circuit is configured to train the trainable transceiver in response to receiving a transmission from the mobile communications device.

15. The apparatus of claim 10, further comprising a radio frequency transceiver coupled to the control circuit, wherein the control circuit is configured to be in wireless communication with the mobile communications device via the radio frequency transceiver.

16. The apparatus of claim 15, wherein the radio frequency transceiver is at least one of a Bluetooth transceiver and a near field communications transceiver.

17. The apparatus of claim 10, further comprising a microphone coupled to the control circuit, wherein the control circuit is configured to receive an audio transmission from the mobile communications device using the microphone.

18. The apparatus of claim 17, further comprising a speaker coupled to the control circuit, wherein the control circuit is configured to be in bi-directional communication with the mobile communications device using audio transmissions sent via the speaker and audio transmissions received via the microphone.

19. The apparatus of claim 10, further comprising a light sensor coupled to the control circuit, wherein the control circuit is configured to receive a light transmission from the mobile communications device using the light sensor.

* * * * *